United States Patent [19]

Colon et al.

[11] Patent Number: 5,171,784
[45] Date of Patent: Dec. 15, 1992

[54] PHOSPHORYLATED REACTION PRODUCTS AND COMPOSITIONS INCORPORATING SUCH PRODUCTS

[75] Inventors: Ismael Colon, Piscataway; Charles B. Mallon, Belle Meade; Robert N. Johnson, Basking Ridge, all of N.J.

[73] Assignee: Union Carbide Chemicals & Plastics Technology Corporation, Danbury, Conn.

[21] Appl. No.: 823,630

[22] Filed: Jan. 17, 1992

Related U.S. Application Data

[60] Continuation of Ser. No. 382,920, Jul. 21, 1989, which is a division of Ser. No. 784,909, Oct. 4, 1985, abandoned, which is a continuation-in-part of Ser. No. 636,895, Aug. 2, 1984, abandoned.

[51] Int. Cl.$^5$ .............................................. C08F 8/40
[52] U.S. Cl. ......................................... 525/40; 525/60; 525/61; 525/328.8; 525/340
[58] Field of Search ................ 525/210, 60, 61, 328.8

[56] References Cited

U.S. PATENT DOCUMENTS

| | | | |
|---|---|---|---|
| 2,528,932 | 11/1950 | Wiles et al. | 106/287 |
| 2,916,473 | 12/1959 | Bullock et al. | 260/47 |
| 3,422,063 | 1/1969 | Barton et al. | 260/47 |
| 3,911,196 | 10/1975 | Navidad | 428/425 |
| 3,998,789 | 12/1976 | Yoshioka | 260/47 P |
| 4,256,844 | 3/1981 | Martin et al. | 521/59 |
| 4,289,812 | 9/1981 | Martin | 427/379 |
| 4,360,613 | 11/1982 | Shimp | 523/416 |
| 4,388,442 | 6/1983 | Taniguchi et al. | 525/61 |
| 4,397,970 | 8/1983 | Campbell et al. | 523/402 |
| 4,452,929 | 6/1984 | Powers et al. | 523/403 |
| 4,481,347 | 11/1984 | Bertram et al. | 528/102 |
| 4,526,837 | 7/1985 | Ohtsuki et al. | 428/425.9 |
| 4,598,109 | 7/1986 | Sekmakas et al. | 523/414 |

FOREIGN PATENT DOCUMENTS

| | | |
|---|---|---|
| 0112924 | 7/1984 | European Pat. Off. . |
| 0112925 | 7/1984 | European Pat. Off. . |
| 0143337 | 6/1985 | European Pat. Off. . |
| 0146897 | 7/1985 | European Pat. Off. . |
| 0172472 | 2/1986 | European Pat. Off. . |
| 141588 | 8/1984 | Japan . |

Primary Examiner—Bernard Lipman
Attorney, Agent, or Firm—S. H. Hegedus

[57] ABSTRACT

Novel phosphorylated compositions of a vinyl chloride copolymer or terpolymer, a phenoxy resin, a hydroxyalkyl acrylate or methacrylatelactone adduct or a reaction product of a normally solid pendant-hydroxyl-containing thermoplastic polymer having at least 8 hydroxyl groups per molecular chain and an adduct which is the product of either a hydroxylalkyl acrylate or methacrylate or a lactone-acrylate adduct and an organic diisocyanate having improved dispersion characteristics suitable for use in applications such as magnetic recording media.

43 Claims, No Drawings

PHOSPHORYLATED REACTION PRODUCTS AND COMPOSITIONS INCORPORATING SUCH PRODUCTS

This application is a continuation of prior U.S. application Ser. No. 07/382,920, filed Jul. 21, 1989, which is a division of application Ser. No. 06/784,909, filed Oct. 4, 1985, now abandoned, which is a continuation-in-part of application Ser. No. 06/636,895, filed Aug. 2, 1984, now abandoned.

RELATED APPLICATIONS

Colon and Mallon, Ser. No. 636,895, filed Aug. 2, 1984, for NOVEL PHOSPHORYLATED REACTION PRODUCTS AND COMPOSITIONS INCORPORATING SUCH PRODUCTS.

Colon, Ser. No. 06/639,008, filed Aug. 9, 1984, for FLEXIBLE, SELF-CROSSLINKING BINDERS.

BACKGROUND OF THE INVENTION

1. Field of the Invention

This invention relates to novel phosphorylated reaction products and, more particularly, to novel products for use in compositions such as magnetic recording media for enhancement of the dispersion and magnetic property characteristics of such medium.

2. Description of the Prior Art

Over the years, magnetic recording has come to occupy a vital place in a myriad of industries. Magnetic tape is accordingly utilized for audio, video, computer, instrumentation and other recordings. Magnetic recording media are utilized in a variety of forms, including, for example, magnetic cards and disks, reels, video tapes, high performance audio tapes, computer tapes, floppy disks, and the like.

While there are several different types of magnetic recording media, all types comprise a layer of magnetic particles, sometimes referred to as "pigment," coated on a plastic, paper or metal base. Information to be recorded is stored in the magnetic pigment as a series of small domains magnetized by a recording head. The coating layer of the magnetic medium includes a binder system which provides a cohesive matrix between the magnetic pigment particles and adheres such particles to the base.

The magnetic coating is applied to the base by coating equipment such as, for example, a gravure roll coater, and the coated base then typically immediately proceeds to a magnetic orientation step wherein orientation of the pigment particles is effected on the undried layer. In this step, the long axis of the pigment particles, typically acicular crystals, is made to coincide with the magnetization direction.

In order to achieve good recording performance, the magnetic coating must possess a wide variety of characteristics. Pigment particles, desirably of relatively uniform particle size, should form as high a proportion of the coating layer as possible. Further, the degree of dispersion of the pigment particles in the coating, often evaluated as degree of gloss, should be as high as possible. Further, the highly dispersed pigment particles must be capable of being adequately oriented, as previously described (the degree of orientation often measured as "squareness").

Still further, the adhesion and wear resistance of the magnetic coating or film should be high. Also, the coefficient of friction of the magnetic surface should be low against the recording and playback head material, and yet have an adequate value against the driving means, such as pinch rollers and capstan rollers.

Satisfying these and other diverse criteria has proven to require a delicate balance of basically reciprocal, or opposing, properties. A substantial amount of effort over the years has been directed to improving the various characteristics of magnetic recording media.

To satisfy the performance criteria, the binder system must possess adequate modulus, yet have satisfactory tensile strength and resilience. It has generally been found more desirable to satisfy these criteria by utilizing more than one material in the binder system. Typically, a polymer of relatively high molecular weight which is capable of being cross-linked or cured is utilized to provide the desired modulus. Various elastomers are also incorporated to achieve the desired resilience and toughness.

Conventional binder systems include a wide variety of high Tg (viz., glass transition temperature) hardening polymers or resins, such as, for example, polyacrylates, polyesters, polyester amides, polyhydroxyethers and copolymers from monomers such as vinyl chloride, vinyl acetate, acrylonitrile, vinyl alcohol, vinyl butyral, and vinylidene chloride in combination with low Tg elastomeric polymers, including nitrile rubbers, polyesters, alkyd resins and polyester polyurethanes. The latter elastomers often represent the material of choice for high performance applications. Such resins have excellent toughness and abrasion resistance.

Typically, the hardening polymers contain hydroxyl functionality since cross-linking to further increase the modulus, durability and abrasion resistance characteristics can then be achieved by using polyfunctional isocyanates. While satisfactory cross-linking can be achieved with polyfunctional isocyanates, such materials are notoriously sensitive to moisture, which can cause problems. Also, cross-linking occurs over a period of time, including while the magnetic recording medium is in storage. Premature cross-linking may also make calendering of the recording medium difficult or impossible.

It would accordingly be desirable to provide a binder resin capable of being cured or cross-linked by electron beam radiation techniques. Various electron beam curable, multifunctional acrylates and methacrylates are known. The difficulty is the method by which such materials may be utilized since these materials have mechanical properties and surface wear resistance characteristics that are generally considered inadequate for magnetic coatings.

The degree of dispersion and the capability of the pigment particles to be oriented in many binder systems are often considered inadequate in the absence of dispersion aids. A wide variety of techniques have been proposed to improve these characteristics. Thus, many surface active agents have been employed for this purpose. These include higher aliphatic amines, higher fatty acids, phosphoric acid esters of higher alcohols such as polyoxyethylene phosphate alkyl ethers, esters of higher fatty acids and sorbitol, sodium alkylbenzenesulfonate, betaine-type, nonionic surface active agents and the like.

Magnetic coatings obtained by employing such surface active agents generally exhibit uniform dispersion of magnetic powder as well as good orientation where the powder or pigment is in the form of acicular particles. On the other hand, utilization of such agents often adversely affects wear resistance or causes difficulties in quality during use. These problems are often attributed to migration or blooming of such surface active agents to the magnetic coating surface or to unnecessary plasticization of the hardening resin or of other components in the magnetic coating.

One attempt to obviate the migration problem is suggested by Great Britain Patent 2,097,415A. This suggests using with a cross-linkable or polymerizable resin binder a phosphoric acid ester having at least one polymerizable unsaturated double bond. Preferably, the phosphoric acid ester is a product obtained by reacting a phosphoric acid ester of a compound having two or more hydroxyl groups with an acrylic or methacrylic compound having a functional group reactive with an isocyanate group and also with a polyisocyanate compound. The phosphoric esters disclosed include two major types: (1) the reaction products of a long chain alkylether or polyester, an acrylic or methacrylic compound having a functional group reactive with an isocyanate group, and a polyisocyanate compound and (2) phosphoric esters of hydroxyalkyl acrylates.

Other binder systems disclosed utilize compounds including various hydrophilic groups such as sulfates, sulphonates, phosphonates and the like. Japanese application 116,474 discloses a magnetic layer binder composition of a polyurethane and optionally a polyester containing sulphonate groups, and a vinyl chloride polymer containing sulphonate, sulphate, carboxylate or phosphonate groups. The binder is stated to have good dispersing function to magnetic powder and the recording medium to have excellent service durability and good surface gloss.

Japanese Patent J57092421-A(8229) discloses a magnetic recording medium which includes a polyester urethane having (1) at least one hydrophilic group such as —SO$_3$M, —OSO$_3$H, —COOM, —P(O)(OM')$_2$, —NH$_2$, —NHR, NR$_1$R$_2$, and NR$_1$R$_2$R$_3$, wherein M may be H, Li, Na or K; M' may be H, Li, Na, K or a hydrocarbon group; and the R groups may be a hydrocarbon group and (2) at least two acrylic-type double bonds.

Japanese J57092422-A(8229) discloses a magnetic layer containing a polyurethane or polyester resin having (1) at least one hydrophilic group selected from —OSO$_3$H, —COOM, —P(O)(OM')$_2$, wherein M may be H, Li, Na, or K and M' may be H, Li, Na, or K or a hydrocarbon group, and (2) a molecular weight of 200 to 5000 per hydrophilic group.

International Publication No. W08400240-A discloses a magnetic recording medium containing a polyvinyl chloride-vinyl acetate-vinyl alcohol and a polyurethane resin containing polar groups such as —SO$_3$M, —OSO$_3$M' —COOM or

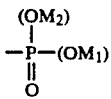

wherein M and M' are as defined above and M$_1$ and M$_2$ may be Li, Na, K or an alkyl group, preferably an alkyl group with up to 23 carbon atoms.

Japanese J55117734-A(8043) discloses a binder for a magnetic recording medium which contains a copolymer of a phosphoric acid ester of an alkylene glycol acrylate or an alkylene glycol methacrylate and a copolymerizable monomer. The wetting properties to ferromagnetic material is stated to be very good, so that dispersibility in the binder is improved. Blooming is said not to occur as no high aliphatic acid, metallic soap, or the like is used.

Among the binder polymers in use in magnetic coating media are commercially available, partially hydrolyzed, (viz., partly saponified) vinyl chloride-vinyl acetate copolymers and terpolymers and phenoxy resins. For the highest performance applications, such as computer tapes, floppy disks and the like, phenoxy resins are often the binder resin of choice because of the superior durability, toughness and thermal stability that is provided.

Unfortunately, the dispersion and orientation characteristics of coatings utilizing such binder polymers are typically less than is desired. Considerable efforts have been undertaken to improve these characteristics with the use of a wide variety of dispersion aids.

U.S. Pat. No. 4,420,537 to Hayama et al. thus discloses a magnetic recording medium including a commercially available vinyl chloride-vinyl acetate-vinyl alcohol copolymer and a phosphoric ester-type anionic surfactant (e.g., "GAFAC RE 610"). It is noted that when the content of the surfactant is more than 5 weight percent of the coating, the surfactant is bloomed out from the magnetic layer.

U.S. Pat. No. 4,153,754 to Huisman notes difficulties with prior dispersing agents. Low molecular weight agents, such as lecithin, have the disadvantage that an excess is necessary to fully cover the particles to be dispersed. The high molecular weight dispersing agents, as described, for example in Netherlands Patent Application No. 65.11015, have the disadvantage that, due to their poor wetting properties, agglomerates of the particles are also covered with a dispersing agent. It is not readily possible, or it is possible only by the use of much energy, to disintegrate such agglomerates to individual particles. Huisman suggests using an N-acylsarcosine derivative as a dispersing agent with the binders. The Examples show use of such a dispersing agent with a commercially available phenoxy resin and a vinyl chloride-vinyl acetate-vinyl alcohol terpolymer.

U.S. Pat. No. 4,291,100 to Horigome et al. discloses a magnetic recording medium utilizing a polyoxyethylenesorbitane higher fatty acid ester surfactant. The Examples include use of such surfactants with vinyl chloride-vinyl acetate copolymers and vinyl chloride-vinyl acetate-vinyl alcohol terpolymers.

U.S. Pat. No. 4,305,995 to Ota et al. shows a magnetic recording medium including a mixture of sorbitane mono-, di-, and tri-higher fatty acid ester surfactants. The Examples show use of such surfactants with vinyl chloride-vinyl acetate copolymers.

U.S. Pat. No. 4,330,600 to Kawasumi et al. discloses a magnetic recording medium in which the dispersion characteristics of magnetizable particles are improved which results in improved saturation magnetic flux density and squareness ratio. These are achieved by treating the magnetizable particles with a titanium alcoholate compound having at least one group which is easily hydrolyzed and at least one oleophilic group which is hard to hydrolyze in an organic solvent. The Examples show use of such titanium alcoholates with a commercially available vinyl chloride-vinyl acetate copolymer binder.

U.S. Pat. No. 4,400,435 to Yoda et al. notes that vinyl chloride-vinyl acetate copolymers have been used as binders, but that such copolymers do not have functional groups whereby it is easy to improve the dispersibility of magnetic powder in a magnetic layer. It is further said that it is not easy to carry out a thermosetting reaction. The use of vinyl chloride-vinyl acetate-vinyl alcohol copolymers instead had been proposed; and, because of the hydroxyl groups present, the dispersibility of magnetic powder is improved and the thermosettable reaction can be performed. However, because of the vinyl alcohol component, the glass transition temperature of the copolymer is disadvantageously high so as to provide difficulties in improving the surface properties by a calendar process. A magnetic recording medium having improved orientation and maximum residual magnetic flux density is provided by using a vinyl chloride-vinyl acetate-maleic acid copolymer having a content of the maleic acid component of at least 1.5 percent.

In addition to the problems of providing a binder system in which the pigment particles can be highly dispersed to form a magnetic coating in which such particles can then be readily oriented in the first instance, the manner of usage can create further problems. Thus, achieving adequate dispersion requires use of relatively high energy mixing equipment. As one example, a mixture of the binder system in a solvent is provided, and the mixture is then thoroughly kneaded and agitated on a 3-roll or high speed agitation mixer or kneader. The resulting slurry is then often transferred to a ball mill, sand grind mill or other dispersion equipment to achieve an even higher degree of dispersion of the magnetic particles in the coating.

If the coating is used rather promptly after formation, no problem results. However, as is sometimes the case, usage requirements may dictate that the coating mixture be stored. Such storage can result in substantial decay of the advantageous dispersion characteristics originally achieved. The use of such "stale" coating mixtures thus presents problems as regards the processing required to allow the pigment particles to attain the desired orientation when such coating mixtures are used and processed. It is obviously economically undesirable to be forced to repeat the initial, high energy mixing sequence.

Accordingly, despite the considerable prior effort in this field, the need remains for a straightforward solution that will allow use of otherwise desirable binders to achieve the desired dispersion and orientation characteristics over a widespread variety of usage requirements.

OBJECTS OF THE INVENTION

A principal object of the present invention is to provide novel phosphorylated compositions for use in applications such as a magnetic coating to impart desirable dispersion and orientation characteristics.

A further object of this invention provides a novel binder system for a magnetic recording medium which may be substituted for conventional binders in formulations as essentially a plug-in substitution.

Yet another object lies in the provision of novel phosphorylated compositions that may be obtained by utilizing a straightforward, facile synthesis.

Another object of the present invention is to provide a binder system for magnetic recording medium which minimizes or eliminates the need to employ a dispersing agent which can cause blooming in use.

A still further object lies in the provision of a magnetic coating which is capable of being processed in conventionally utilized magnetic coating equipment.

Yet another object lies in the provision of a magnetic coating which may be stored for extended periods of time and yet may be readily processed to provide, upon usage, the desired magnetic characteristics.

Another object is to provide a binder system capable of being cross-linked or cured by electron beam radiation. A related object is to provide a hardening resin that is curable by electron beam radiation and which further provides desirable dispersion characteristics.

A further object of the present invention lies in the provision of a dispersing agent which can be chemically combined within the binder system to obviate migration or blooming in the cured coating.

These and other objects of the present invention will be apparent from the description set forth hereinafter.

SUMMARY OF THE INVENTION

The present invention is based on the discovery that conventional vinyl chloride-vinyl ester copolymers and terpolymers, phenoxy resins, certain lactone-adducts, and resins resulting from the reaction of certain hydroxyl-containing thermoplastic resins with an adduct of a hydroxyl-containing acrylate monomer and selected polyisocyanates, may be phosphorylated to provide magnetic recording media having desirable dispersion and magnetic characteristics. Such phosphorylated compositions can be synthesized in a straightforward, facile manner and can provide a magnetic coating having the viscosity and other characteristics that allow usage in conventional magnetic coating equipment. Inclusion in conventional magnetic coating formulations does not require significant change. By suitable selection in the synthesis, the resulting binder system should be capable of being cured by electron beam radiation. Indeed, when the resin resulting from the reaction of the hydroxyl-containing thermoplastic polymers resin with an adduct of an acrylate monomer and selected polyisocyanates is employed, the resulting binder system can be readily cured by electron beam radiation. The resulting system may also be stored for extended periods of time before usage, and the system may thereafter be readily treated with a relatively low molecular weight phosphorylated material of this invention to allow achievement of the necessary magnetic characteristics. The relatively low molecular weight phosphorylated material may likewise be used as an additive in conventional binder systems for the same purpose. By suitable selection of the low molecular weight phosphorylated material for the particular curing technique to be employed, such materials will be chemically combined in the cured coating and will not bloom or migrate.

In accordance with one aspect of the present invention, the hardening resin utilized to provide the requisite modulus and other strength characteristics is suitably phosphorylated to provide characteristics adequate to achieve the requisite pigment dispersion and magnetic properties. In accordance with another aspect of this invention, a phosphorylated dispersant material capable of reaction directly or indirectly with the binder utilized is employed.

As used herein, the term "phosphorylation" means the conversion of hydroxyl groups to phosphates. Accordingly, the phosphorylated compositions of the present invention can be likewise considered as phosphate esters.

DETAILED DESCRIPTION OF THE INVENTION

Phenoxy Resins

Phenoxy resins synthesized by the reaction, in alkali media, of essentially equimolar amounts of a dihydric phenol and a monoepoxide or diepoxide containing, respectively, one and two oxirane groups, i.e., oxygen bonded to two vicinal aliphatic carbon atoms, are known and may be characterized by the following formula:

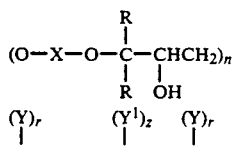

wherein X is $Ar-R^1-Ar$, Ar or mixtures or reaction residues thereof, Ar is an aromatic divalent hydrocarbon such as naphthylene and, preferably, phenylene, Y and $Y^1$, which can be the same or different, are alkyl radicals, preferably having from 1 to 4 carbon atoms, halogen atoms, i.e., fluorine, chlorine, bromine and iodine, or alkoxy radicals, preferably having from 1 to 4 carbon atoms, r and z are integers having a value from 0 to a maximum value corresponding to the number of hydrogen atoms on the aromatic radical (Ar) which can be replaced by substituents and $R^1$ is a bond between adjacent carbon atoms as in dihydroxydiphenyl or is a divalent radical including, for example, —CO—, —O—, —S—, —SO—, —$SO_2$— and —S—S—, and divalent hydrocarbon radicals such as alkylene, alkylidene, cycloaliphatic, e.g., cycloalkylidene, halogenated alkoxy- or aryloxy-substituted alkylene, alkylidene and cycloaliphatic radicals as well as alkarylene and aromatic radicals including halogenated, alkyl, alkoxy— or aryloxy-substituted aromatic radicals and a ring fused to an Ar group; or $R^1$ can be polyalkoxy, or polysiloxy, or two or more alkylidene radicals separated by an aromatic ring, a tertiary amino group, an ether linkage, a carbonyl group or a sulfur containing group such as sulfoxide, and the like; R is hydrogen or an alkyl radical of from 1 to about 20 carbon atoms, and n is typically at least about 50 and preferably is about 100 or more to provide resins capable of providing systems having desirable modulus and toughness characteristics and the like.

Examples of specific dihydric phenols desirably used in the preparation of the phenoxy resin include, among others: The bis(hydroxyphenyl) alkanes such as
2,2-bis(4-hydroxyphenyl)propane,
2,4'dihydroxydiphenylmethane,
bis(2-hydroxyphenyl-methane,
bis(4-hydroxyphenyl)methane,
bis(4-hydroxy-2,6-dimethyl-3-methoxyphenyl)methane,
1,1-bis(4-hydroxyphenyl)ethane,
1,2-bis(4-hydroxyphenyl)ethane,
1,1-bis(4-hydroxy-2-chlorophenyl)ethane,
1,1-bis(3-methyl-4-hydroxyphenyl)ethane,
1,3-bis(3-methyl-4-hydroxyphenyl)propane,
2,2-bis(3-phenyl-4-hydroxyphenyl)propane,
2,2-bis(3-isopropyl-4-hydroxyphenyl)propane,
2,2-bis(2-isopropyl-4-hydroxyphenyl)propane,
2,2-bis(4-hydroxynaphthyl)propane,
2,2-bis(4-hydroxyphenyl)pentane,
3,3-bis(4-hydroxyphenyl)pentane,
2,2-bis(4-hydroxyphenyl)heptane,
bis(4-hydroxyphenyl)phenylmethane,
bis(4-hydroxyphenyl)cyclohexylmethane,
1,2-bis(4-hydroxyphenyl-1,1-bis(phenyl)propane,
2,2-bis(4-hydroxyphenyl)-1-phenyl-propane, and the like.

Di(hydroxyphenyl)sulfones such as
bis(4-hydroxyphenyl)sulfone,
2,4'-dihydroxydiphenylsulfone,
5'-chloro-2,4'-dihydroxydiphenyl sulfone,
5'-chloro-4,4'-dihydroxydiphenyl sulfone, and the like;

Di(hydroxyphenyl)ethers such as
bis(4-hydroxyphenyl)ether, the 4,3'—, 4,2'—, 2,2'—, 2,3'—, dihydroxydiphenyl ethers,
4,4'-dihydroxy-2,2-dimethyldiphenyl ether,
bis(4-hydroxy-3-isobutylphenyl)ether,
bis(4-hydroxy-3-isobutylphenyl)ether,
bis(4-hydroxy-3-chlorophenyl)ether,
bis(4-hydroxy-3-fluorophenyl)ether,
bis(4-hydroxy-3-bromophenyl)ether,
bis(4-hydroxynaphthyl)ether,
bis(4-hydroxy-3-chloronaphthyl)ether,
bis(2-hydroxydiphenyl)ether,
4,4'-dihydroxy-2,5-diethoxydiphenyl ether, and the like.

Also suitable are the bisphenol reaction products of 4-vinylcyclohexene and phenols, e.g., 1,3-bis(p-hydroxyphenyl)-1-ethylcyclohexane and the bisphenol reaction products of dipentene or its isomers and phenols such as 1,2-bis(p-hydroxyphenyl)-1-methyl-4-isopropylcyclohexane, as well as bisphenols such as 1,3,3-trimethyl-1-(4-hydroxyphenyl)-6-hydroxyindane, and 2,4-bis(4-hydroxyphenyl)-4-methylpentane, and the like.

Particularly desirable dihydric phenols have the formula:

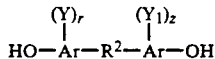

wherein Y and $Y_1$ are as previously defined, r and z have values from 0 to 4 inclusive and $R^2$ is a divalent saturated aliphatic hydrocarbon radical, particularly alkylene and alkylidene radicals having from 1 to 3 carbon atoms, and cycloalkylene radicals having up to and including 10 carbon atoms. Mixtures of dihydric phenols can likewise be employed and are thus intended to be included.

The mono- and diepoxide compounds are preferably saturated, that is, are free of ethylenic and acetylenic unsaturation. Particularly preferred are halogen-substituted monoepoxides, that is, the epihalohydrins, and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxycarbonyl oxygen —COO—, carbonyl oxygen —CO—, and the like.

Specific examples of monoepoxides include epihalohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluoropropane, and the like.

Illustrative diepoxides include diethylene glycol bis(3,4-epoxycyclohexane-carboxylate), bis(3,4-epoxycyclohexyl-methyl)adipate, bis(3,4-epoxycyclohexyl-methyl)phthalate, 6-methyl-3,4-epoxycyclohexylmethyl-methyl-3,4-epoxycyclohexane carboxylate, 2-chloro-3,4-epoxycyclohexylmethyl-2-chloro—, 4-epoxycyclohexanecarboxylate, diglycidyl ether of bisphenol-A, bis(2,3-epoxycyclopentyl)ether, 1,γ-pentanediol bis(2,3-epoxy-2-ethylhexyl)adipate, diglycidyl maleate, diglycidyl phthalate, 3-γatetracyclo[4.4.0.17,10 02,4)-undec-8-yl 2,3-epoxypropyl ether, bis(3,4-epoxyhexoxypropyl)sulfone, 2,γ'-sulfonyldiethyl-bis(2,3-epoxycyclopentanecarboxylate), 3-oxytetracyclo-4.4.0.17,10 02,4]-undec-8-yl 2,γ-epoxybutyrate, bis(2,3-epoxybutylphenyl-2- ethylhexyl phosphate, diepoxydioxane, butadiene dioxide, and 2,3-dimethyl butadiene dioxide. The preferred diepoxides are those wherein each of the oxirane groups is connected to an electron-donating substituent which is on a carbon atom one carbon atom removed from the carbon atoms of that oxirane group, such electron-donating substituents including, for example, —O—, —S—, —SO—, —C—O—, and the like.

Phenoxy resins generally considered desirable as hardening resins in magnetic recording media are further characterized by viscosities at 25° C., as 40 percent by weight solutions in methylethylketone, of at least about 4500 centipoise, suitable viscosities typically ranging from about 4500 to about 7700 centipoise or so.

The preferred phenoxy resin is the reaction product of bisphenol-A and epichlorohydrin and may be characterized by the following formula:

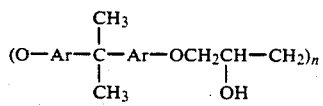

wherein Ar is a phenyl radical and n is from about 80 to about 120.

As is known, the phenoxy resins are characterized by superior durability, toughness and thermal stability. Such characteristics make phenoxy resins a desirable material of choice for applications considered to have the most rigorous performance requirements, such as floppy disks, computer tapes, and the like.

In accordance with the present invention, the phenoxy resin starting material selected is suitably phosphorylated to provide the desired magnetic coating component. Conceptually, the extent of phosphorylation should be sufficient to improve the pigment wetting properties of the phenoxy resin. The phosphorylated phenoxy resin will thus assist in achieving the desired dispersion and magnetic characteristics in the magnetic coating. The extent to which the phenoxy resins are phosphorylated is not particularly critical but will depend on a number of factors insofar as the utility of the phosphorylated resin in the preparation of magnetic coatings is concerned. To that end, the extent or level of phosphorylation must be such that the phosphorylated resin is soluble in the aprotic solvents conventionally used in preparing magnetic coatings in an amount sufficient to provide the desired binder system and to permit application of the binder system to the desired base. The degree of phosphorylation should generally likewise be such that the glass transition temperature of the phosphorylated resin is not significantly lower than about 70° C. in order to insure the proper modulus of the coating. Further, the degree of phosphorylation must be such that the phosphorylated resin remains compatible with other components of the binder system, particularly the elastomeric polymer employed, such as a polyurethane, and the like.

A further consideration concerning the level of phosphorylation is the curing technique that will be employed. Thus, if a conventional polyisocyanate cure is to be utilized, adequate hydroxyl functionality should remain to allow sufficient cross-linking to be carried out. Further, even with synthesizing resins to be cured by other than the polyisocyanate technique, it has been found desirable to utilize a less than fully phosphorylated derivative. Such derivatives appear to provide in a magnetic recording medium more desirable dispersion and magnetic property characteristics.

Consistent with these parameters, phosphorylation of about 0.5 to about 80%, preferably about 1 to about 5%, of the hydroxyl groups present in the phenoxy resin can be used for materials intended to be isocyanate-cured, the remaining unphosphorylated hydroxyl groups providing active sites for reaction with the isocyanate. On the other hand, use of reaction products wherein complete phosphorylation of the hydroxyl groups has been obtained is possible where the resin is curable by electron beam radiation, since the hydroxyl groups do not enter into the curing reaction. These levels of phosphorylation can be obtained by suitably adjusting the relative amounts of the resin and the phosphorylating agent employed.

The temperature at which the phosphorylating reaction is carried out is not critical but is dependent on the phosphorylating agent employed. In general, however, it is desirable that the phosphorylation reaction be carried out at elevated temperatures to provide adequate reaction of the hydroxyl groups and insure complete reaction, suitable temperatures being about 50° C. to about 200° C. In carrying out the phosphorylation, the reaction should utilize a phosphorylating agent and conditions that will avoid forming significant amounts of higher molecular weight species, as would result when two phenoxy molecules are linked together through the phosphate moiety. The presence of such high molecular weight species can result in systems having undesirably high viscosities. This is obviously of greater significance when the phenoxy resin starting material is already of a relatively high molecular weight.

Suitable phosphorylation agents include phosphoryl chloride and its derivatives: $PO(OR^3)_{n'}$ —$Cl_{3-n'}$, wherein n' is 0, 1, 2, or 3 and $R^3$ is hydrogen, a saturated or unsaturated hydrocarbon radical having from 1 to about 20 carbon atoms, a cycloalkyl radical of from 1 to about 20 carbon atoms, an alkyl acrylate or methacrylate in which the alkyl radical is from 1 to about 10 carbon atoms, aryl and substituted aryl of from 6 to about 20 carbon atoms and adducts of hydroxyalkyl acrylates and methacrylates and a lactone (as described more fully hereinafter), and mixtures thereof, or phosphorus pentoxide or the reaction product of phosphorus pentoxide with a hydroxyl-containing material, including water, saturated or unsaturated alcohols having from 1 to 20 carbon atoms, hydroxyalkyl acrylates or methacrylates having from 2 to 10 carbon atoms, substituted and unsubstituted phenols and adducts of hydroxyalkyl acrylates and methacrylates and a lactone which will be described more fully hereinafter, and mixtures thereof.

The phosphorylation reaction may be carried out in any of a variety of aprotic solvents. Suitable examples include methylethylketone, tetrahydrofuran and cyclohexanone. The amount of the phenoxy resin starting material added to the aprotic solvent may be varied within a wide range, provided the material is soluble in the solvent and the viscosity of the solution is not so high as to prevent stirring and adequate mixing. In general, a level of about 25 weight percent of phenoxy resin has been satisfactorily employed. The relative amounts of the phosphorylating agent and the phenoxy resin may be selected to provide the desired level of phosphorylation.

Suitable selection of the phosphorylating agent will allow preparation of a phosphorylated phenoxy resin capable of being cured by electron beam radiation. Thus, when the phosphoryl chloride or phosphorus pentoxide derivatives previously set forth include a residue of an electron beam curable acrylate or methacrylate, the resulting phosphorylated phenoxy resin should be capable of being cured by electron beam radiation.

Selection of a phenoxy resin starting material of a molecular weight adequate to provide the desired modulus for the particular application allows use of the phosphorylated phenoxy resin of this invention as, if desired, essentially a plug-in substitution in conventional magnetic coatings utilizing phenoxy resins. Use of lower molecular weight phenoxy resins may likewise be employed, although the particular application may require use of conventional phenoxy or other hardening resins to build the desired modulus and other characteristics. Alternatively, building of the modulus of the lower molecular weight materials may be achieved for some applications during the curing process.

Vinyl Resins

A variety of vinyl chloride-vinyl ester copolymers and terpolymers has been previously utilized in magnetic recording media. The number average molecular weight should be at least about 1000, more typically at least about 2000. Useful resins with number average molecular weights up to about 25,000 are commercially available. Conventionally, only the higher molecular weight materials, for example, those having a molecular weight greater than about 15,000 or so, are used as hardening resins in magnetic recording media. Especially suitable vinyl chloride-vinyl ester copolymers or terpolymers are those in which some or all of the ester groups have been hydrolyzed. In general, such copolymers and terpolymers consist of vinyl chloride, a vinyl ester and vinyl alcohol, preferably in the molar ratio of about 28-32 vinyl chloride to about 0.5-8 vinyl alcohol to about 0 to 4 vinyl ester. Vinyl esters suitably used in the preparation of these terpolymers include vinyl formate, vinyl acetate, vinyl propionate, vinyl butyrate, and the like. Other higher vinyl esters up to about 6 carbon atoms likewise may be used.

Other equally suitable copolymers and terpolymers are hydroxyalkyl acrylate and methacrylate-modified vinyl chloride polymers such as the random hydroxyl-functional copolymers or terpolymers of vinyl chloride, hydroxyalkyl acrylate or methacrylate having 2 to about 5 carbons in the alkyl segment, and vinyl esters of carboxylic acids of 1 to about 6 carbon atoms, such as vinyl acetate, vinyl propionate, and the like. Suitable hydroxyl-functional copolymers and terpolymers are described in U.S. Pat. Nos. 3,884,887 and 3,755,271. In general, the molar ratio of the components of such copolymers and terpolymers is about 12-20 vinyl chloride to about 0-3 vinyl ester to about 1-3 hydroxyalkylacrylate or methacrylate.

The vinyl chloride-vinyl ester and vinyl chloride-vinyl ester-hydroxyalkyl acrylate and methacrylate copolymers and terpolymers described above will be sometimes referred to hereinafter as the "vinyl resins."

In accordance with the present invention, the vinyl resin starting material selected is suitably phosphorylated to provide the desired magnetic coating component. Due to the thermal stability characteristics of such materials, the phosphorylation reaction should be carried out at a temperature and under such conditions as to avoid significant degradation of the vinyl resin. The phosphorylation reaction temperature may be varied depending on the composition and molecular weight of the vinyl resin, the phosphorylating agent used, and also on the presence or absence of thermal stabilizers known to those skilled in the art, the use of such stabilizers allowing the reaction to be carried out at temperatures higher than would otherwise be desirable due to the thermal stability characteristics of the vinyl resins.

The phosphorylation reaction may be carried out by dissolving the starting vinyl resin in an aprotic solvent to which the desired phosphorylating agent is added with stirring. The reaction may proceed at room temperature with stirring until the reaction is complete.

Suitable phosphorylating agents include phosphorus pentoxide, phosphorus pentoxide derivatives, and phosphoryl chloride and its derivatives, as has been previously described in conjunction with the synthesis of the phosphorylated phenoxy resins of this invention.

Alternatively, in the case of a hydroxyalkyl acrylate or methacrylate-modified vinyl chloride copolymer or terpolymer, the acrylate or methacrylate may be initially phosphorylated. The phosphorylated intermediate may then be used to either synthesize the desired copolymer or terpolymer, or may be employed as a phosphorylating agent for any of the vinyl chloride polymers described herein. This is likewise true when other hydroxyl-functional monomers are used.

As with the phosphorylation of the phenoxy materials, in carrying out the phosphorylation of the vinyl resins, the reaction should utilize a phosphorylating agent and conditions that will avoid the formation of significant amounts of higher molecular weight species, as would result when two of the starting vinyl resins are linked through the phosphate moiety. Inclusion of small amounts of water in the reaction mixture prevents the formation of such species. Typically, the Vinyl resins, as prepared and as commercially available, contain a small amount of water which is sufficient to prevent the formation of such species. However, the relatively high level of water sometimes present in such vinyl resins generally results in the inefficient utilization of the phosphorylating agent. As an alternative, the vinyl resins may be dried and the level of water optimized to maximize the utilization of the phosphorylating agent while still preventing the formation of significant amounts of the high molecular weight species.

Also, as has been previously described, the degree of phosphorylation can vary widely but should be sufficient to improve the pigment wetting properties of the vinyl resins. The solubility and compatibility factors are the same as those discussed in conjunction with the phenoxy resins. With respect to the higher molecular weight materials, e.g., about 8000 or greater, the Tg considerations are the same as with the phenoxy resins, except that the Tg of these materials should generally not be lowered to significantly less than 65° C. With respect to lower molecular weight materials, that is, those of about 8000 or less, the Tg of the vinyl resin when cross-linked or cured should likewise not be significantly less than 65° C., again to insure the desired modulus of the coating.

The level or degree of phosphorylation suitable to provide the desired characteristics will generally be such that, based on the weight of the phosphorylated vinyl resin, the phosphorus content of the material may be as low as about 0.03% by weight, more desirably at least about 0.1% and even more desirably at least about 0.3%. Levels as high as about 1% by weight are typically preferred, and levels up to perhaps even as high as about 3% by weight may be suitable.

When the starting material selected has an adequate molecular weight to provide the requisite modulus and other characteristics for the particular magnetic recording medium application, an essentially plug-in substitution in the conventional formulations using such starting materials as hardening resins may be utilized. However, even starting materials of lower molecular weights will of course be suitable although conventional hardening resins may be needed to build the desired modulus for the particular application. Alternatively, building of the modulus of the lower molecular weight materials may be achieved during the curing process.

Lactone-Hydroxyalkyl Acrylate or Methacrylate-Adducts

In accordance with yet another aspect of the present invention, a magnetic recording medium characterized by superior dispersion and magnetic property characteristics may be achieved by utilizing in the preparation a phosphorylated lactone-adduct.

The lactone-acrylate adduct of this invention and suitable for use as a dispersing agent in magnetic media is the reaction product of a lactone and a hydroxyalkyl acrylate or methacrylate. The lactone-acrylate adduct may be represented by the following formula:

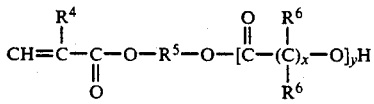

wherein $R^4$ is hydrogen or methyl, $R_5$ is an alkyl group of from 2 to about 10 carbon atoms, $R_6$ is independently hydrogen or an alkyl group of from 1 to about 12 carbon atoms, x is an integer of from about 4 to about 7, and y is an integer of from 1 to about 10.

The lactones suitable for use in preparing the lactone-acrylate adduct are characterized by the following formula:

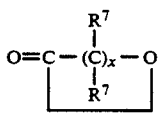

wherein $R^7$ is independently hydrogen or an alkyl of from 1 to about 12 carbon atoms, and x is from about 4 to about 7. The preferred lactone is epsilon-caprolactone.

The hydroxyalkyl acrylates and methacrylates which may be used include 2-hydroxyethyl acrylate and methacrylate, hydroxypropyl acrylate and methacrylate, hydroxybutyl acrylate and methacrylate, 2-hydroxy 3-chloro-propyl acrylate and methacrylate, 2,3-dihydroxy propyl acrylate and methacrylate, and the like, or mixtures thereof. As is known, the reactivity of the acrylates to electron beam radiation is superior to that of the methacrylates, thus the acrylates will generally be preferred. Hydroxyethylacrylate is particularly preferred. Also, if desired, in the formula previously set forth, the terminal methylene group could have one of the hydrogen atoms replaced by a methyl group. The resulting adduct would likely be less reactive to electron beam radiation than acrylates or methacrylates.

The lactone-acrylate adduct is prepared by reacting the lactone with the hydroxyalkyl acrylate in the presence of less than about 200 parts per million of a catalyst. The catalysts which may be used include one or more organometallic compounds and other metallic compounds such as stannic chloride or ferric chloride and other Lewis and protonic acids. Preferred catalysts include stannous octoate, dibutyltin dilaurate, and other tin compounds; titanates such as tetraisopropyl titanate and butyl titanate; and the like.

The reaction is carried out at a temperature of from about 100° to about 400° C., preferably from about 120° to about 130° C. The reaction may be carried out at atmospheric pressure, although higher or lower pressures may be used. The reaction is generally carried out in the presence of oxygen to inhibit polymerization of the hydroxyalkyl acrylate. The reaction is carried out for a period of from about 2 to about 20, preferably from about 3 to about 1 hours. The reaction is carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone and other common free radical inhibitors known in the art. The level of inhibitor used is less than 1000 parts per million, preferably less than 800 parts per million, and most preferably, less than 600 parts per million.

The phosphorylation technique employed may be that described in conjunction with the preparation of phosphorylated vinyl and phenoxy resins. The degree of phosphorylation should be at least on the order of about 50% of the hydroxyl groups, and it is preferred that phosphorylation approach 100%. The desired levels of phosphorylation can be readily obtained by providing the appropriate stiochiometric quantity of phosphorylating agent. Any unreacted phosphorylating agent can ordinarily be allowed to remain in the system as a diluent.

The resulting phosphorylated lactone-adduct provides superior dispersibility of the pigment particles in the magnetic coating and yields a magnetic coating capable of being satisfactorily oriented to provide the desired magnetic property characteristics. Such dispersants are of particular value, as well, in recovering the decayed properties of magnetic compositions which have been stored prior to usage.

Reaction Product Of A Hydroxyl-Containing Thermoplastic Resin And A Hydroxyl-Containing Acrylate Monomer-Diisocyanate Adduct Pursuant to a still further aspect of this invention, a binder resin for magnetic recording medium is provided which is curable by electron beam radiation and has essentially no free phosphorylating agent. To this end, the binder resin comprises the reaction product of a hydroxyl-containing thermoplastic resin and a hydroxyl-containing acrylate monomer-diisocyanate adduct which is phosphorylated within a controlled range. When used in preparing a magnetic recording medium, excellent pigment dispersion is provided; and superior magnetic property characteristics are obtained.

The normally solid pendant hydroxyl-containing thermoplastic polymers can be thermoplastic polyhydroxyethers, hydrolyzed vinyl chloride/vinyl acetate copolymers, ethylene/vinyl alcohol copolymers, hydroxyl-carrying polyesters, polyethers, polyurethanes, acrylic acid copolymers and the like all carrying at least, and preferably more than, 8 hydroxyl groups.

The term "thermoplastic polyhydroxyether" herein refers to substantially linear polymers having the general formula:

[D—O—E—O]$_n$ wherein D is the radical resdiuum of a dihydric phenol, E is a hydroxyl-containing radical residuum of an epoxide and n represents the degree of polymerization and is at least 30 and is preferably 80 or more. The term "thermoplastic polyhydroxyether" is intended to include mixtures of at least two thermoplastic polyhydroxyethers.

Suitable thermoplastic polyhydroxy ethers are those phenoxy resins previously described. Thermoplastic polyhydroxy ethers of this type are available commercially from Union Carbide Corporation as UCAR® phenoxy resins.

Illustrative hydrolyzed vinyl chloride/acetate copolymers include vinyl chloride/vinyl acetate/vinyl alcohol terpolymers, and the like. These are commercially available from Union Carbide Corporation as VAGH, and VAGD UCAR® Solution Vinyl Resins. The alpha-olefin vinyl alcohol copolymers useful in this invention contain the moieties (a) and (b) delineated in the graphical formulae shown below:

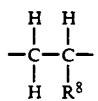 (a)

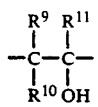 (b)

wherein each of $R^8$, $R^9$, $R^{10}$ and $R^{11}$ are hydrogen or an alkyl group having 1 to about 8 carbon atoms. The preferred alpha-olefin/vinyl alcohol copolymer is ethylene/vinyl alcohol copolymer where $R^8$, $R^9$, $R^{10}$ and $R^{11}$ are each hydrogen moieties (a) and (b).

The vinyl alcohol content of these copolymers may vary from 1 to 90 mole percent. Preferred copolymers contain about 20 to about 70 mole percent while most preferred alpha olefin/vinyl copolymers contain about 25 to about 65 mole percent. These copolymers can be prepared by the saponification of the corresponding alpha olefin/vinyl acetate copolymers. The preparation of ethylene/vinyl alcohol copolymers is described in U.S. Pat. No. 3,157,563 at Column 2, line 33 to line 63, which reference is incorporated herein by reference. It should be noted that incompletely saponified products are also useful, i.e, terpolymers containing ethylene, vinyl acetate and vinyl alcohol. The preferred terpolymers are those having a vinyl alcohol content as specified above.

Other hydroxyl-containing polyesters include esters of glycols and dibasic acids such as poly(1,4-butylene adipate), poly(1,4-butylene acetate), poly(1,4-butylene suberate), poly(1,4-butylene sebacate), poly(1,3-propylene oxalate), poly(1,2-ethylene malonate) and the like. Exemplary hydroxyl-containing polyethers include: poly(ethylene glycol), poly(1,2-propylene glycol), poly(2,3-propylene glycol), poly(1,4-propylene glycol) and the like.

With respect to the acrylate monomer-diisocyanate adduct, the acrylate monomer can, according to one embodiment, comprise a hydroxyalkyl acrylate or methacrylate. Useful species are typically those having 2 to 4 carbon atoms in the chain. The hydroxyalkyl acrylates and methacrylates which thus may be employed include 2-hydroxyethyl acrylate and methacrylate, hydroxypropyl acrylate and methacrylate, hydroxybutyl acrylate and methacrylate, 2-hydroxy, 3-chloropropyl acrylate and methacrylate, 2,3-dihydroxy propyl acrylate and methacrylate, and the like, or mixtures thereof.

According to another embodiment of this invention, the acrylate monomer comprises the reaction product of a lactone and a hydroxyalkyl acrylate or methacrylate. Useful lactone-acrylate adducts are those described herein in the prior section of this specification.

In its preferred form, the preparation of the electron beam curable binders of this invention is accomplished by utilizing a monohydroxy terminated acrylate ester of epsilon-caprolactone dimer known as TONE-M-100 and having the structural formula:

HO(CH$_2$)$_5$COO(CH$_2$)$_5$COOCH$_2$CH$_2$OCOCH=CH$_2$

The diisocyanates suitable for use herein are known in the art and include the aliphatic and aromatic diisocyanates. Many such compounds are known to those skilled in the art and illustrative thereof one can mention 2,4-toluene diisocyanate, 2,6-toluene diisocyanate, isophorone diisocyanate, 4,4'-diphenylmethane diisocyanate, di(2-isocyanatoethyl)-bicyclo (2.2.1) hept-5-ene-2,3-dicarboxylate, 3,5,5-triethyl-1-isocyanato-3-isocyanate-methylcyclohexane, 1,6-hexamethylene diisocyanate, m- and p-xylene diisocyanate, cyclohexane-1,4-diisocyanate, dicyclohexyl-4,4'-methane diisocyanate, tetramethylene diisocyanate, cyclopentylene-1,3-diisocyanate, 1,3-diisocyanate, 1,4-xylylene diisocyanate, 1,5-naphthalene diisocyanate, m-phenylene diisocyanate, p-phenylene diisocyanate, hexamethylene diisocyanate, 3,3'-dimethyl-4,4'-diphenyl-methane diisocyanate, 4,4'diphenylmethane diisocyanate, 3,3'-dimethylbiphenylene diisocyanate, 4,4'biphenylene diisocyanate, 3,3'-dimethoxy-4,4'-dimethyl 4,4'-biphenylene diioscyanate, durene diisocyanate, 1-phenoxy-2,4-phenylene diisocyanate, 1-tert-butyl-2,4-phenylene diisocyanate, 2,2,4-trimethylhexamethylene diisocyanate, and the like, or mixtures thereof.

It is preferred to utilize, as the diisocyanate, isophorone diisocyanate (IPDI) having the structure:

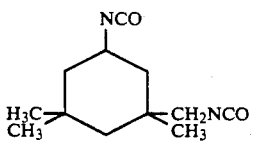

The product obtained by reaction of TONE-M-100 with IPDI has the idealized structure A:

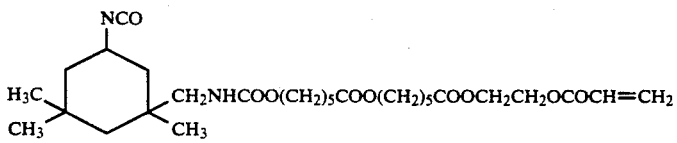

(A)

Typically, the resulting adduct would, of course, be a mixture of species, including that having the idealized structure.

The process employed to prepare the hydroxyl-containing acrylate monomer-diisocyanate adduct is not particularly critical. Accordingly, any reaction conditions and catalysts may be employed as are conventionally used in the reaction of diisocyanates and hydroxyl-containing compounds. The principal criteria is that the reaction be carried out such that the resulting adduct ideally has one isocyanate group which remains for reaction with the hydroxyl-containing thermoplastic resin. For this reason, it is preferred to employ diisocyanates wherein there is a difference in reactivity of the two —NCO groups. To prevent undue gellation when reacted with the hydroxyl-containing thermoplastic polymer, it is also important that the adduct employed contain a minimum of free (viz.—residual) diisocyanate. This can be determined by analytically determining the level of free diisocyanate as may be accomplished by known methods.

Also, while not preferred, organic polyisocyanates other than diisocyanates can be utilized. However, useful polyisocyanates must have —NCO groups with differing reactivity with the hydroxyl groups of the acrylate monomer so that the subsequent reaction with the hydroxyl-containing thermoplastic resin can be satisfactorily carried out.

In similar fashion to the preparation of the adduct, reaction conditions for the grafting reaction between the adduct and the hydroxyl-containing thermoplastic resin are not particularly critical. Again, suitable conditions for the reaction of hydroxyl-containing compounds and isocyanates are known and may be utilized. It is preferred to minimize the presence of free isocyanate at the end of this reaction, and this can be determined by known analytical techniques.

In accordance with the present invention, the reaction product obtained from the grafting reaction is then phosphorylated to provide the binder resins of this invention. The phosphorylation techniques described herein may be utilized.

The minimum degree of phosphorylation is that needed to provide the desired enhanced dispersibility for the pigments to be utilized. This may be achieved by phosphorylation of about 1.0% of the hydroxyl groups present. Indeed, for some applications, sufficient dispersibility for the pigment employed may be provided by phosphorylating as little as 0.5% of the hydroxyl groups present or even less. The extent of phosphorylation needed for a particular application may be determined by straightforward experimentation, viz.—by phosphorylating to a particular extent and then determining the adequacy of the dispersibility provided.

The maximum level of phosphorylation is determined by the magnetic properties desired. Satisfactory properties are obtained when phosphorylation proceeds to about 3% of the hydroxyl groups present, and a phosphorylation level of about 4% should also be acceptable. As the degree of phosphorylation proceeds up to 5%, the desired magnetic properties diminish so that such levels will generally be undesirable for most applications. It has been found that the diminution of the desired magnetic properties results when the viscosity of the binder resin is unduly high.

Pursuant to one aspect of this invention, it has been found that the phosphorylated resins obtained using the acrylate monomer-diisocyanate adduct do not contain free phosphoric acid. More specifically, in contrast to the prior phosphorylated products described herein (e.g., as results form the direct phosphorylation of a phenoxy resin), the phosphorylated resins including the adduct, at equivalent levels of phosphorylation, do not contain free phosphoric acid (as determined by nuclear magnetic resonance). The reason for this surprising result is not fully understood. However, utilizing such resins gives the ability to provide binder resins for those applications where the presence of free phosphoric acid would be considered undesirable.

It has been found that the viscosity of the reaction product of the hydroxyl-containing thermoplastic resin with the adduct can increase dramatically over time, even resulting in gelling in a few days when such resins contain substantial amounts of unreacted or residual isocyanate. It is, of course, feasible to use resins having relatively substantial amounts of residual isocyanate by promptly phosphorylating such resins and thereafter promptly utilizing the phosphorylated resin to prepare the desired magnetic recording medium. Alternatively, maintaining the reaction product at ambient temperatures or below should minimize any such viscosity increase. It is, of course, also possible to carry out the process for a time and under conditions such that the amount of residual isocyanate is reduced to the level where undue viscosity increases do not result.

However, and pursuant to yet another aspect of the present invention, there is provided a means for enhancing the viscosity stability over time, hence providing enhanced shelf life and processing latitude even when such reaction product contains what would otherwise be a higher than desired residual isocyanate content, i.e.—a level that would be expected to result in an undue viscosity increase. To this end, it has been discovered that adding methanol to the reaction product will provide viscosity stability, even when the reaction product is exposed to temperatures above ambient conditions. While not wishing to be bound by this theory, it is believed that the viscosity increases are due to crosslinking occurring through reaction of the residual isocyanate groups. The addition of methanol, over time, proceeds to endcap the molecule, terminating the molecule in a non-molecular weight building fashion. Since this proceeds over time, the phosphorylation can be carried out at a stage in which the reaction product has sufficient reactivity to allow a facile phosphorylation to take place.

Accordingly, in addition to methanol, any monofunctional compound having an active hydrogen (according to the Zerewitinoff test) should likewise be useful. To allow latitude, it would be preferred to use active hydrogen functionalities such as hyrdoxyl-containing compounds that are known to be somewhat slower in reaction with isocyanate groups than amines and the like, although primary and secondary amines may be employed. Indeed, it would be suitable to use the hydroxyalkyl acrylates and methacrylates described herein. The use of such acrylates and methacrylates would further enhance curing when using electron beam radiation.

The amount of methanol or the like should be desirably employed in about a stoichiometric amount relative to the residual isocyanate, so as to minimize any ester exchange type of reaction that could adversely affect the acrylate moiety, resulting in a loss of the desired electron beam cure. Suitable amounts can be readily determined by straightforward analytical techniques.

From the standpoint of a resin manufacturer, or simply to allow latitude between preparation of the phosphorylated resins of this invention and preparing the magnetic recording medium, yet another alternative is suitable. To this end, the reaction product can be promptly phosphorylated after preparation. Thereafter, methanol or the like can be added in an amount to enhance the viscosity stability over time. This will thus allow preparation of the magnetic recording medium to be delayed as desired.

It has been found that the phosphorylated resins according to this aspect of the present invention can, after preparation of the magnetic media formulation, be readily cured by electron beam radiation. Typically, exposure to an electron beam at a dose of 10 Mrads (megarads), more typically about 5 Mrads or even somewhat less, will provide adequate curing.

Reaction Product Design Considerations

It should be appreciated that the extent of phosphorylation desired must take into account the degree of conversion achieved with the particular process conditions used. With phenoxy resins, conversions of about 40 to 60% should be obtained using the conditions described herein. A desired phosphorylation level may be achieved by adjusting the relative concentrations of the reactants utilized.

With vinyl resins, conversion levels obtained will vary widely, depending upon the process conditions and the reactivity of the phosphorylating agent employed. Under the conditions used in the Examples herein, conversions of about 10 to 20% should be obtained. Adjustment of the concentrations of the reactants used should take such conversion levels into account. The particular conversion obtained in a given situation should be capable of being determined in a straightforward manner by analysis.

With the reaction product using the diisocyanate adduct, conversions of about 60 to 90 percent should be expected. Indeed, essentially complete conversion can be obtained.

In the case of lactone-adducts, the reaction temperature is a principal factor. While ambient conditions result in incomplete conversion, reaction at an elevated temperature should achieve essentially complete conversion. Where incomplete conversion is obtained, the phosphorylated materials may be readily separated by known techniques, if desired.

Separation in the case of the reaction products resulting from phosphorylation of phenoxy and vinyl resins need not be considered. As long as the reaction product has the desired level of phosphorylated material, the reaction product may be directly used in magnetic coatings.

Description of the Phosphorylated Products

It can be seen from the description of the phosphorylating agents described above that phosphorus may be included in the phosphorylated vinyl resins, phenoxy resins and lactone-adducts of the present invention in the form of a wide variety of phosphorus ester moieties, characterized by the formula:

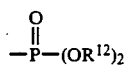

wherein $R^{12}$ comprises hydrogen, alkyl or alkenyl having from 1 to about 20 carbon atoms, an alkyl acrylate or methacrylate residue having from 2 to about 10 carbon atoms in the alkyl segment, substituted and unsubstituted phenyl, the lactone-adduct described herein, or mixtures thereof.

The formula for the phosphorus moieties represents an idealized formula. Depending upon the reaction conditions and the particular phosphorylating agent employed, the resulting reaction product comprises a distribution of mono—, di- and triphosphate esters. Accordingly, in the idealized formula, $R^{12}$ may be solely hydrogen (providing a phosphate monoester), a mixture of hydrogen and the hydrocarbon residue of the hydrocarbon from which the derivative was prepared (providing a diester), or solely the hydrocarbon residue (providing a triester). For the purpose of the present invention, the phosphorus moiety will be described in terms of the formula set forth, wherein the formula is used to represent the reaction product, including those situations wherein a complex mixture or distribution of compositions is obtained.

Magnetic Recording Medium

Base

Any base or substrate may be utilized, and the particular substrate of choice will be dictated for the most part by the particular application. Polyethylene terephthalate and polypropylene films are in wide use as base materials for magnetic recording media. Where heat resistance is an important consideration, a polyimide film, polyamide film, polyarylether film, or the like may be utilized. In the case of a polyester film as a thin base, it is often used after monoaxial or biaxial orientation. It is likewise well known that pretreatment of the film may be beneficial to promote wetting and adhesion.

Composition of the Magnetic Coating Layer

The magnetic particles may be any of those known and useful in conventional magnetic recording media.

Representative examples include acicular or granular $\gamma$-$Fe_2O_3$, $Fe_3O_4$, Co-doped $\gamma$-$Fe_2O_3$, Co-doped $\gamma Fe_2O_3$-$Fe_3O_4$ solid solution, Co-base-compound-adsorbed $\gamma Fe_2O_3$, a Co-base-compound-adsorbed $Fe_3O_4$ (including those oxidized to an intermediate state between itself and $\gamma$-$Fe_2O_3$), and acicular $CrO_2$. (The term "Co-base compound" as used herein means cobalt oxide, cobalt hydroxide, cobalt ferrite, cobalt ion-adsorbates and the like which enable the magnetic particules to take advantage of the magnetic anisotropy of cobalt in improving its coercive force). Also, the magnetic particle may be a ferromagnetic metal element or alloy, such as Co, Fe-Co, Fe-Co—Ni, or the like. Such a fine magnetic particle is prepared in a number of ways, including wet reduction of the starting material with a reducing agent such as $NaBH_4$, a treatment of the iron oxide surface with a Si compound and subsequent dry reduction with $H_2$ gas or the like, and vacuum evaporation in a low pressure argon gas stream. Fine particles of monocrystalline barium ferrite may be employed as well. The fine magnetic powder is used in the form of acicular or granular particles, depending on the application of the resulting magnetic recording medium.

It will be generally desirable to utilize a relatively large amount of magnetic particles in the coating layer. Typical compositions of the coating layer will thus include about 65 or 70 to about 85 or 90 percent magnetic particles, based upon the total weight of the coating layer. As is known, it is desirable to utilize pigment particles of relatively uniform size, with typically used particles having a long axis of about 0.4 micron or even less being employed. The remainder of the coating layer will comprise the binder system, including the hardening resin, and typically an elastomeric polymer, a dispersant, a cross-linker and any auxiliary agents. Depending upon the novel phosphorylated material of the present invention which is utilized, the dispersant as such may be minimized or even eliminated. Further, when electron beam radiation curable materials are used, the cross-linking agent need not be employed.

Accordingly, and conceptually, in addition to the pigment particles, the only additional essential component in accordance with this invention is the hardening resin itself. Typical coating layers will, however, often include the additional components identified depending upon the particular end use application. As is apparent from the amount utilized in typical formulations of the pigment particles, the remainder of the coating layer will generally represent about 10 or 15 to 30 or 35 percent by weight of the coating layer.

As has been previously discussed, the binder system will generally, and desirably, include an elastomeric polymer in an amount sufficient to provide the coating layer with the desired resilience and the like. Many elastomeric polymers suitable for this purpose are known and may be utilized. Polyester urethanes are often preferred for high performance applications. Suitable materials are commercially available. These materials may be, in general, described as the reaction products of polyester polyols, short chain diols, and isocyanates. These resins have excellent toughness and abrasion resistance characteristics.

A wide variety of polyisocyanate cross-linkers is known and may be used. As one example, it is suitable to use toluene diisocyanate (TDI). The amount of the cross-linking agent used is typically about 20 to 30 percent of the amount that would be required stoichiometrically.

As is known, a variety of auxiliary agents is sometimes employed in the magnetic coating layer. Such additives are known and may be employed, if desired for the particular application. Examples of such auxiliary agents include antistatic agents, lubricants, sensitizers, leveling agents, wear-resisting agents, and film-reinforcing agents.

In further accordance with the present invention, the magnetic coating layer utilizes the phosphorylated materials of the present invention to provide the necessary dispersing and orientation characteristics of the coating, and, in some instances, function as the hardening resin as well. If the phosphorylated material has characteristics which provide the necessary modulus and the like for the magnetic coating layer, no other hardening resin need be employed. However, if desired, the phosphorylated materials of the present invention can be utilized with compatible hardening resins to provide the desired magnetic coating layer.

In accordance with this invention, the use of the phosphorylated materials of the present invention should provide improved dispersion and orientation characteristics. However, if desired, other conventional dispersing agents may be employed.

Preparation of Coating

The recording medium may generally be prepared by dissolving the binder system in a sufficiently volatile vehicle to provide a coatable dispersion of fine magnetizable particles. The dispersion can then be coated onto the substrate to provide a coating thereon. The magnetic recording medium may be prepared by methods described in the art such as in, for example, S. Tochihara, "Magnetic Coatings and their Applications in Japan," Progress in Organic Coatings, 10 (1982), pages 195 to 204.

Post-Additive Treatment

In accordance with yet another aspect of the present invention, the phosphorylated materials of the present invention may be utilized to, in effect, rejuvenate the decayed properties of magnetic compositions stored for some time prior to usage. Often, after storage, magnetic compositions which exhibited satisfactory dispersion during preparation possess undesirable orientation characteristics when processed to form a tape or the like due to change in the compositions during storage. The addition of appropriate phosphorylated materials of the present invention will, without a repetition of the high energy mixing techniques used to prepare the magnetic compositions in the first instance, allow the coating to provide adequate magnetic properties upon orientation. When used in this fashion, it is preferred to utilize the lower molecular weight phosphorylated materials of this invention. Suitable materials will generally have a molecular weight of less than about 4000. In general, the lower molecular weight materials are more effective. It is thus preferred to utilize the phosphorylated lactone-adducts and phosphorylated vinyl resins having a number average molecular weight of less than about 4000.

Usage of these materials can provide substantial restoration of the properties and should achieve more than adequate orientation, as is evidenced by the squareness measurement. Selected usage of these materials as a post-additive provides the further advantage that there is no blooming or migration of the additive. To this end, the phosphorylated vinyl resins are particularly desired for use in binder systems which are to be isocyanate-cured because of the presence of residual hydroxyl groups on the vinyl resin which are capable of being cross-linked and chemically combined in the coating as a result of the isocyanate cure. On the other hand, the lactone-adducts are particularly desired for use in binder systems which are to be cured by electron beam radiation because of the presence of the unsaturated carbon-carbon bonds of the acrylate or methacrylate residue. When used in the respective binder systems described, these materials are chemically combined in the cured coating and do not migrate or bloom.

Other Applications

While use of the phosphorylated materials of the present invention provides highly advantageous properties in magnetic recording media and the present invention has been described in conjunction with this application, it should be appreciated that such materials likewise can be utilized as dispersants and/or hardening resins in any other application where the characteristics of such phosphorylated materials could desirably be incorporated. For example, conventional zinc-rich coatings are useful in many applications which require corrosion resistance and the like. Such compositions typically comprise a high percentage of zinc particles (up to about 85 to 90 percent by weight of the composition) and a resin, together with such optional components as antisettling agents, thickening agents and water scavengers, as is known. Since many such applications require exposure to high temperatures, the use of the phosphorylated phenoxy resins of this invention should find advantageous use. For zinc-rich maintenance coatings, and other clear and pigmented coatings, any of the phosphorylated materials of the present invention should provide improved dispersibility and improved adhesion to substrates. The phosphorylated materials of this invention can accordingly be readily utilized in conjunction with such coatings.

Indeed, the phosphorylated lactone-adducts of this invention may be used as surfactants in emulsion polymerizations.

Further, the more highly phosphorylated materials of this invention should be water dispersible and thus may be useful in applications where this property would be desirable, such as, for example, in water-borne coatings.

EXAMPLES

The following Examples are representative of the present invention, and not in limitation thereof. The starting materials used, the preparation of the magnetic media formulations, and the evaluation techniques utilized in the ensuing Examples were as follows:

Starting Materials

Phenoxy Resin A

A commercially available reaction product of bisphenol-A and epichlorohydrin having a specific gravity of 1.17 to 1.19, a viscosity at 25° C., in 40% methylethylketone solution, of 4500–7000 cps, a nonvolatiles content of 99% by weight, and a Tg of 98°–100° C.

Phenoxy Resin B

A commercially available reaction product of bisphenol-A and epichlorohydrin having a specific gravity of 1.17 to 1.19, a viscosity at 25° C., in 40% methylethylketone solution, of 2500–3500 cps, a nonvolatiles content of 99% by weight, and a Tg of 80°–85° C.

Vinyl Resins

Vinyl Resin A

A commercially available vinyl chloride-vinyl acetate-hydroxypropyl acrylate terpolymer having a number average molecular weight of about 2000, an average hydroxyl content of 4% by weight and a hydroxyl equivalent weight, on a solids basis, of 400.

Vinyl Resin B

A commercially available vinyl chloride-vinyl acetate-hydroxypropyl acrylate terpolymer having a number average molecular weight of about 4000, an average hydroxyl content of 3% by weight and a Tg of 40° C.

Vinyl Resin C

A commercially available vinyl chloride-vinyl acetate-hydroxypropyl acrylate copolymer having a number average molecular weight of about 8000, an average hydroxyl content of 2.3% by weight, and a Tg of 65° C.

Vinyl Resin D

A commercially available, partially hydrolyzed vinyl chloride-vinyl acetate copolymer having a number average molecular weight of about 23,000, an average hydroxyl content of 2.3% by weight, and a Tg of 79° C.

Vinyl Resin E

A commercially available, partially hydrolyzed vinyl chloride-vinyl acetate copolymer having a number average molecular weight of about 23,000, an average hydroxyl content of 5% by weight, and a Tg of 79° C.

Vinyl Resin F

A partially hydrolyzed vinyl chloride-vinyl acetate-maleic acid terpolymer having a number average molecular weight of about 20,000, an average hydroxyl content of 2% by weight, and a Tg of 74° C.

Lactone-adduct

A lactone-adduct made from hydroxyethyl acrylate and epsilon-caprolactone and having an average of two caprolactone units per acrylate.

Elastomer A

B. F. Goodrich "Estane 5701 F-1" polyester polyurethane elastomer having a specific gravity of 1.21, a Tg of −25° C. and a Brookfield viscosity of 300 cps for a 15% total solids solution in tetrahydrofuran.

Preparation of the Magnetic Media Formulations

Formulations were prepared by premixing 134 grams of a 15 percent cyclohexanone solution of the resin with 160 grams of cyclohexanone and adding 200 grams of cobalt-modified, iron oxide magnetic pigment with particles having a long axis of about 0.4 micron ("PFERRICO 2566" magnetic pigment, Pfizer, Inc.). After the mixture was well blended with an air stirrer for 15–30 minutes, the resulting slurry was added to a Premier Mill filled with 1.3 mm glass beads and milled for about one hour.

Those formulations containing only vinyl or phenoxy resins, including the phosphorylated derivatives of the present invention, were discharged at this point and evaluated. Those to contain Elastomer A were stopped at this stage, and the Elastomer A was added (134 grams of a 15% solution in cyclohexanone). The formulation was then milled for an additional hour and discharged.

Any post-additions were made at this stage by mixing the ingredients by hand with a spatula or a stirring rod. The percentages in such post-additions are all based upon the weight of the pigment in the formulation.

Magnetic Media Evaluations

Gloss

This was evaluated by preparing a 1-mil drawdown on glass, allowing the formulation to air dry and then measuring the gloss with a 60% gloss meter.

Squareness

This was measured by preparing a 3-mil wet drawdown on a Mylar substrate and then pulling the Mylar across a bar magnet to orient the magnetic particles. Squareness was then measured on a 2×2 inch piece of this oriented coating using a LDJ Model 7000A B-H Meter. According to the pigment manufacturer, the maximum squareness achievable with the magnetic pigment utilized is 0.84.

EXAMPLES 1-8

These Examples illustrate the preparation of the novel phenoxy phosphate esters of the present invention by reaction of a phenoxy resin with various phosphorus-containing precursors and intermediates. The phosphorus-containing precursor was added to a 25 percent by weight solids solution of phenoxy resin in cyclohexanone, and the resulting solution was reacted with stirring for several (2-4) hours at temperatures of 75° to 145° C. To minimize cross-linking which could occur with reagents like phosphoryl chloride and phosphorus pentoxide, intermediates of these reagents were prepared. With phosphoryl chloride, this was reacted at room temperature with 2.5 molar equivalents of n-butanol to produce an intermediate which was then reacted with the phenoxy resin. Phosphorus pentoxide was dissolved in cyclohexanone at 60° to 100° C. and reacted with certain hydroxyl-containing materials in certain molar amounts to form a variety of intermediates which were then reacted with the phenoxy resin.

Table I sets forth the phosphorylating agents utilized, the molar equivalents of co-reactant (if any), the reaction temperature, and the percent substitution, set forth as the theoretical percent of the hydroxyl groups on the phenoxy resin that could have been phosphorylated:

TABLE I

| EXAMPLE | PHOSPHORYLATING AGENT | TEMP °C. | % SUBSTITUTION |
|---|---|---|---|
| 1 | $POCl_3$ + 2.5 n-butanol | 100 | 10 |
| 2 | $POCl_3$ + 2.5 n-butanol | 100 | 20 |
| 3 | diethyl chlorophosphate | 75 | 20 |
| 4 | $P_2O_5$ + 4 lactone-adduct | 100 | 10 |
| 5 | $P_2O_5$ + 4 lactone-adduct | 100 | 20 |
| 6 | $P_2O_5$ + 2 lactone-adduct | 100 | 20 |
| 7 | $P_2O_5$ + 2 phenol | 145 | 20 |
| 8 | $P_2O_5$ | 70 | 20 |

EXAMPLES 9-22

These Examples show the preparation of novel phosphate esters in accordance with this invention prepared from vinyl resins and the lactone-adduct.

These phosphate esters were prepared by dissolving the vinyl resin or the lactone-adduct precursor in an aprotic solvent, either acetone or cyclohexanone, and adding phosphorus pentoxide with stirring. The reaction was carried out at room temperature with stirring for 24 hours or until all of the phosphorus pentoxide had been dissolved, whichever was longer. All of the samples were stored at room temperature until used. All of the samples were used without further purification, with the exception of Example 15 which was precipitated from acetone, washed with warm water and dried in a vacuum oven to a constant weight.

Table II sets forth the starting materials used, the percent of phosphorus pentoxide being based upon the weight of the starting material, and the percent substitution being the theoretical percentage of the initial hydroxyl groups present converted to phosphate esters, assuming that 3 phosphate esters are produced from each $P_2O_5$ molecule

TABLE II

| EXAMPLE | STARTING MATERIAL | % $P_2O_5$ | % SUBSTITUTION |
|---|---|---|---|
| 9 | Vinyl Resin A | 4 | 32 |
| 10 | Vinyl Resin A | 1 | 8 |
| 11 | Vinyl Resin A | 2 | 16 |
| 12 | Vinyl Resin A | 5 | 40 |
| 13 | Vinyl Resin A | 7.5 | 60 |
| 14 | Vinyl Resin B | 3.3 | 40 |
| 15 | Vinyl Resin C | 6 | 100 |
| 16 | Vinyl Resin D | 0.5 | 11 |
| 17 | Vinyl Resin D | 1.0 | 22 |
| 18 | Vinyl Resin D | 1.3 | 22 |
| 19 | Vinyl Resin D | 2.5 | 55 |
| 20 | Vinyl Resin D | 4.0 | 81 |
| 21 | Vinyl Resin E | 3.3 | 24 |
| 22 | Lactone-adduct | 14 | 100 |

EXAMPLE 23-24

EXAMPLE 23

As noted above, the reaction product of Example 15 (Resin C) was purified according to the following procedure. About 80 ml of the Example 15 solution was rapidly stirred while an equal volume of 80/20 mixture of isopropanol/$H_2O$ was slowly added. A precipitate formed. After stirring for 20 minutes at room temperature, 160 ml of $H_2O$ were added and the mixture stirred for about an additional 20 minutes. The precipitate was collected by filtration, washed twice with warm water and dried at 50° C. under vacuum to constant weight. It was found by atomic adsorption spectroscopic analysis of the precipitate that the Vinyl Resin C phosphate contained 0.34% by weight phosphorus.

EXAMPLE 24

A 15% solution of Vinyl Resin D in 500 g cyclohexanone was reacted with 4 g of $P_2O_5$ with stirring at room temperature. After 24 hours from the start of the reaction, a portion of the solution was precipitated by slowly adding the solution to about five times its volume of ice water in a running blender. The resulting polymer was collected by filtration, washed several times with warm water, and dried to constant weight in a vacuum oven at 40°-50° C. The polymer was analyzed for phosphorus content and found to contain 0.4% phosphorus by weight of the polymer by atomic adsorption spectroscopic analysis. The same precipitation was carried out on another part of the sample 48 hours after the first sampling, that is, 72 hours from the start of the phosphorylating reaction; and the phosphorus content, by weight, was found to be the same within experimental error.

EXAMPLES 25-36

These Examples illustrate the improved characteristics achieved with the novel phosphorylated materials of the present invention as compared with the starting resins.

Coatings were made as has been hereinbefore described from the starting resins and from the novel phosphorylated resin reaction products prepared in Examples 4, 5, 7, 9 and 14-21. No dispersants were added to either the controls or to the phosphorylated resins. The gloss and squareness characteristics are set forth in Table III:

TABLE III

| EXAMPLE NO. | RESIN | 60° GLOSS | SQUARENESS |
|---|---|---|---|
| Control | Vinyl Resin A | 60 | 0.82 |
| 25 | Ex. 9 | 102 | 0.84 |
| Control | Vinyl Resin B | 34 | 0.82 |
| 26 | Ex. 14 | 71 | 0.82 |
| Control | Vinyl Resin C | 53 | 0.82 |
| 27 | Ex. 15 | 104 | 0.84 |
| Control | Vinyl Resin D | 59 | 0.78 |
| 28 | Ex. 16 | 52 | 0.82 |
| Control | Vinyl Resin D | 59 | 0.78 |
| 29 | Ex. 17 | 65 | 0.82 |
| Control | Vinyl Resin D | 59 | 0.78 |
| 30 | Ex. 18 | 65 | 0.82 |
| Control | Vinyl Resin D | 59 | 0.78 |
| 31 | Ex. 19 | 58 | 0.84 |
| Control | Vinyl Resin D | 59 | 0.78 |
| 32 | Ex. 20 | 62 | 0.83 |
| Control | Vinyl Resin E | 57 | — |
| 33 | Ex. 21 | 73 | 0.83 |
| Control | Phenoxy Resin | — | — |
| 34 | Ex. 5 | 94 | 0.82 |
| Control | Phenoxy Resin | — | — |
| 35 | Ex. 4 | 104 | 0.81 |

As can be seen, the novel phosphorylated materials of the present invention provide coatings with higher gloss and/or improved squareness in all instances, relative to the starting resin.

Squareness for Vinyl Resin E was not measured. The dispersion with the phenoxy resin starting material is so poor that neither the gloss measurement nor the squareness value were taken since this would be considered not meaningful.

EXAMPLES 37-44

These Examples demonstrate the disperse characteristics of the phosphorylated vinyl and phenoxy resins of the present invention in the presence of Elastomer A, the amount of Elastomer A added to the coating being that set forth in the general preparation. The results are set forth in Table IV:

TABLE IV

| EXAMPLE NO. | RESIN | GLOSS | SQUARENESS |
|---|---|---|---|
| 37 | Ex. 4 | 69 | 0.74 |
| 38 | Ex. 5 | 71 | 0.81 |
| 39 | Ex. 7 | 44 | 0.72 |
| 40 | Vinyl Resin D | 50 | 0.74 |
| 41 | Ex. 16 | 58 | 0.75 |
| 42 | Ex. 17 | 61 | 0.76 |
| 43 | Ex. 19 | 42 | 0.81 |
| 44 | Ex. 20 | 40 | 0.82 |

As can be seen from these Examples and the comments regarding the characteristics of the parent with prior Examples 34-36, the phosphorylated vinyl and phenoxy resins of the present invention provide improved dispersion and magnetic characteristics to a magnetic coating compared to their parent, unphosphorylated, resins.

EXAMPLES 45-46

These Examples demonstrate the utility of the phosphorylated lactone-adducts of the present invention as a dispersant in a magnetic coating.

Coatings were made from Vinyl Resin D and Phenoxy Resin A and the gloss and squareness characteristics of such coatings were compared to coatings to which the lactone-adduct phosphate of the present invention has been added. The results are set forth in Table V:

TABLE V

| EXAMPLE NO. | RESIN | % LACTONE-ADDUCT PHOSPHATE | GLOSS | SQUARENESS |
|---|---|---|---|---|
| Control | Vinyl Resin D | 0 | 59 | 0.78 |
| 45 | Vinyl Resin D | 2 | 61 | 0.85 |
| Control | Phenoxy Resin | 0 | — | — |
| 46 | Phenoxy Resin | 3 | 54 | 0.81 |

As can be seen from Table V, the use of the lactone-adduct phosphate of this invention results in both enhanced gloss and squareness.

EXAMPLES 47-50

These Examples illustrate the function of the lactone-adduct phosphates of the present invention as a post-additive dispersant to improve the squareness of a previously prepared formulation.

Magnetic coatings using the elastomeric polymer (Elastomer A) and Vinyl Resin F were prepared. The squareness of the formulation was evaluated in comparison with this formulation to which varying amounts of the lactone-adduct phosphate of the present invention had been added as a post-additive. The results achievable with a prior art surfactant are set forth for comparative purposes. The results are set forth in Table VI:

TABLE VI

| EXAMPLE NO. | BINDER COMPOSITION | SQUARENESS |
|---|---|---|
| Control | 10% Vinyl Resin F  10% Elastomer A | 0.69 |
| 47 | Control + 5% lactone-adduct phosphate | 0.83 |
| 48 | Control + 2.5% lactone-adduct phosphate | 0.80 |
| 49 | Control + 1.2% lactone-adduct phosphate | 0.73 |
| 50 | Control + 0.6% lactone-adduct phosphate | 0.71 |
| Prior Art | Control + 5% "GAFAC RE-610 Surfactant" | 0.84 |

As shown, the post-addition of the lactone-adduct phosphate of the present invention enhances the squareness characteristic of the magnetic coating. While the prior art surfactant likewise provides such improvement, the use of the lactone-adduct phosphate of the present invention obviates the known migration problem of the prior art surfactant in electron beam curable binder systems.

EXAMPLES 51-53

These Examples demonstrate the effectiveness of the phosphorylated vinyl resins of the present invention as post-additives.

Magnetic coatings were prepared utilizing a 50-50 mixture of Vinyl Resin F and Elastomer A. The squareness of this control was then evaluated in comparison to the post-addition treatment with equivalent amounts of Vinyl Resin A and the phosphorylated products of Examples 11 to 13, as well as with the result obtained with a prior art surfactant. The results are set forth in Table VII:

TABLE VII

| EXAMPLE NO. | ADDITIVE | % PHOSPHOR-YLATION | SQUARE-NESS |
|---|---|---|---|
| Control | — | — | 0.72 |
| Control | 4% Vinyl Resin A | — | 0.74 |
| 51 | 4% - Ex. 11 | 16 | 0.76 |
| 52 | 4% - Ex. 12 | 40 | 0.78 |
| 53 | 4% - Ex. 13 | 60 | 0.83 |
| Prior Art | 4% GAFAC RE-610 | — | 0.84 |

As can be seen, the use of the phosphorylated vinyl resin of this invention enhances the squareness characteristics of the magnetic coating. The vinyl resins are especially useful in isocyanate-cured binder systems and obviate the known migration or blooming problem of the prior art surfactant due to the cross-linking of the vinyl resin during isocyanate cure of the binder system.

EXAMPLE 54

This Example illustrates that the phosphorylated phenoxy polymers of the present invention can be used to provide zinc-rich coatings that have better solvent resistance and better corrosion protection than conventional zinc-rich coatings made from the parent phenoxy resin.

A zinc-rich paint was made by mixing 200 g of zinc dust, 118.2 g of the reaction product of Example 5, 6.2 g "MPA 60X" antisettling agent, 1.8 g "Aerosil R-972" thickening agent, and 1.0 g CaO (a water scavenger) in a media mill. This solution was let down with 47 g of cyclohexanone and coated (at a dried thickness of 0.4-mil on cold-rolled steel panels. The panels were air dried at room temperature for one hour and then baked at 180° C. for 30 minutes.

For comparison purposes a zinc-rich paint was made using 125 g of a 25% solution of the parent phenoxy resin instead of the reaction product of Example 5 in the formulation above. Steel panels were coated with this formulation and treated in an identical fashion as those coated with the phosphorylated phenoxy resin, zinc-rich coating.

Both sets of panels were exposed to drawing, methylethylketone double rub, and salt spray tests. While both sets of panels passed a double draw cup test, demonstrating good flexibility, the zinc-rich coating utilizing the phosphorylated resin of this invention was more solvent-resistant (24 rubs vs. 3). After 300 hours of salt spray testing, the panels coated with the zinc-rich coating using the parent phenoxy resin showed some corrosion on flat portions of the panel, and extensive corrosion on Olsen buttons on the panels, while the panels with the zinc-rich coating utilizing the phosphorylated resin of the present invention had essentially no corrosion on either flat or drawn (Olsen button) areas.

EXAMPLES 55-64

The following Examples illustrate the use of relatively low levels of phosphorylation of phenoxy resin, i.e., less than about 5% of the available hydroxyl groups are phosphorylated.

EXAMPLE 55

A solution of 350 g of oven-dried Phenoxy Resin B in 1115.8 ml of molecular sieve-dried cyclohexanone was made in a 2000-ml flask equipped with a mechanical stirrer, water-cooled condenser, and thermometer. The contents were protected from moisture pick-up from the atmosphere by inclusion of a drying tube at the top of the condenser. The solution was heated to 80° C., and 4.37 g $P_2O_5$ (2.5 mol percent) were added. After two hours at 80° C., all the $P_2O_5$ had dissolved and reacted. The clear, yellow solution had a viscosity of 1577 cks/25° C. and a solids content of 26.2%.

A mixture was made of: 30 g of resin (100% solids basis), 170 g of PFERRICO 2566, and 330 g of cyclohexanone, and dispersed one hour using the Premier Mill. The properties of the dispersion and films made from it were: viscosity of 7900 cps, gloss (1-2 mil drawdown on a glass plate) of 85, and squareness ratio (1-2 mil drawdown on Mylar) of 0.840.

EXAMPLE 56

The procedure used was the same as for Example 55, except that the $P_2O_5$ used was 2.19 g (1.25 mol percent) and the reaction time was one hour at 80° C. Solids content of the resulting solution was 25.4%. After formulation, milling and testing as in Example 55, the properties of the dispersion and films were as follows:

| Resin | 30 | 30 | 16 |
|---|---|---|---|
| PFERRICO 2566 | 170 | 170 | 200 |
| GAFAC RE-610 | — | 1.7 | 6 |
| Estane 5701 | — | — | 24 |
| Cyclohexanone | 330 | 330 | 401 |
| Viscosity, cps | 6700 | 3600 | 4800 |
| Gloss | 78 | 82 | 43 |
| Squareness Ratio | 0.790 | 0.820 | 0.830 |

EXAMPLE 57

To 2400 g dry Phenoxy Resin B in a 12-liter flask were added 7651 ml dry cyclohexanone. A solution was made by heating to 75°-80° C. To this was added 1.5 mol percent $P_2O_5$ (18.0 g in two additions). The temperature was held at 80°-90° C. for 2.5 hours. The clear resin solution was filtered through bolting cloth to remove dirt. The viscosity was 1430 cks/25° C. and the solids content was 25.1%.

The following formulations were milled one hour and tested:

| Resin | 30 | 30 | 16 |
|---|---|---|---|
| PFERRICO 2566 | 170 | 170 | 200 |
| GAFAC RE-610 | — | 1.7 | 6 |
| Estane 5701 | — | — | 159 |
| Cyclohexanone | 330 | 330 | 406 |
| Viscosity, cps | 3100 | 4600 | 6200 |
| Gloss | 92 | 90 | 49 |
| Squareness Ratio | 0.830 | 0.822 | 0.836 |

EXAMPLE 58

A solution of 350 g of dry Phenoxy Resin B in 1115.8 ml of dry cyclohexanone was made in a two-liter flask and heated to 80° C. A total of 11.16 g (5.0 mol percent) of polyphosphoric acid ($H_4P_2O_7$) was added in two additions as fast as they could be poured. Reaction was continued for 1.5 hours at 80° C. The clear, amber resin solution had a viscosity of 1593 cks/25° C. and a solids content of 26.0%.

After formulation and one hour of milling, the results were as follows:

| Resin | 30 | 30 | 30 | 16 | 16 |
|---|---|---|---|---|---|
| PFERRICO 2566 | 170 | 170 | 170 | 200 | 200 |
| GAFAC RE-610 | — | 1.7 | 5.1 | — | 6 |
| Estane 5701 | — | — | — | 24 | 24 |
| Cyclohexanone | 330 | 300 | 330 | 325 | 325 |
| Gloss | 90 | 82 | 65 | 62 | 40 |
| Squareness Ratio | 0.76 | 0.77 | 0.73 | 0.77 | 0.75 |

EXAMPLE 59

The same procedures were followed as for Example 58, except that 150 g of phenoxy resin in 450 g cyclohexanone were reacted with 2.34 g (2.5 mol percent) polyphosphoric acid. The product solution had a solids content of 25.4% and a viscosity of 1246 cks/25° C. After formulation and one hour of milling, the properties of the dispersion and drawn films were as follows:

| Resin | 30 |
|---|---|
| PFERRICO 2566 | 170 |
| Cyclohexanone | 330 |
| Viscosity, cps | 4300 |
| Gloss | 95 |
| Squareness Ratio | 0.825 |

EXAMPLE 60

A solution of 575 g dry Phenoxy Resin A in 1833 ml dry cyclohexanone was made and heated to 65° C. A total of 7.18 g $P_2O_5$ (2.5 mol percent) was added in two additions. The mixture was heated one hour and ten minutes, allowed to stand overnight, and then filtered through bolting cloth to give a clear, yellow solution. The viscosity was 2970 cks/25° C. and solids were 25.7%. After one hour of milling, the properties were:

| Resin | 30 |
|---|---|
| PFERRICO 2566 | 170 |
| Cyclohexanone | 330 |
| Viscosity, cps | 3000 |
| Gloss | 93 |
| Squareness Ratio | 0.880 |

EXAMPLE 61

The same procedures were followed as for Example 60, except that 575 g Phenoxy Resin A in 1833 ml cyclohexanone were reacted with 4.31 g $P_2O_5$ (1.5 mol percent), added in one addition. The mixture was heated for 1.5 hours at 68° C. and let stand overnight, then filtered through bolting cloth. The solids content was 27.1%. After formulation and milling for one hour, the dispersion and film properties were:

| Resin | 30 |
|---|---|
| PFERRICO 2566 | 170 |
| Cyclohexanone | 330 |
| Gloss | 95 |
| Squareness Ratio | 0.850 |

EXAMPLE 62

A solution of 300 g dry Phenoxy Resin A in 1014 ml of dry THF was made in a 2-liter flask. After heating to 57° C., 3.75 g $P_2O_5$ (2.5 mol percent) were added. The mixture was heated 10 hours at 57° C. and allowed to stand 16 hours at room temperature. Some undissolved $P_2O_5$ remained. After filtering, the viscosity was 720 cks and the solids content was 25.8%. After one hour of milling, the properties of the dispersion and film were as follows:

| Resin | 30 |
|---|---|
| PFERRICO 2566 | 170 |
| THF | 330 |
| Gloss | 87 |
| Squareness Ratio | 0.800 |

EXAMPLE 63

A solution of 150 g dry Phenoxy Resin A in 507 ml dry THF was made in a one-liter flask. After heating to 58° C., 2.34 g (2.5 mol percent) $H_4P_2O_7$ were added, and the reaction was continued for four hours at 58° C. A very light yellow, clear solution resulted. The solution viscosity was 400 cks/25° C. at 25.7% solids. After formulation and milling for one hour, properties were as follows:

| Resin | 30 |
|---|---|
| PFERRICO 2566 | 170 |
| THF | 330 |
| Gloss | 86 |
| Squareness Ratio | 0.81 |

EXAMPLE 64

Similar desirable results were achieved when the concentration of the $H_4P_2O_7$ was reduced to 1.5 mol percent. Likewise, similar desirable results were obtained when Phenoxy Resin B was substituted for Phenoxy Resin A at the lower phosphorylation level.

EXAMPLE 65

This Example illustrates the preparation of a phosphorylated resin prepared from the reaction product of Phenoxy Resin B and a TONE-M-100/IPDI adduct and the use of such phosphorylated resin in a magnetic recording medium.

A 30-gallon still equipped with a turbine agitator (3 horsepower, providing a range of 20–400 r.p.m.) was used. The still was equipped with a condenser and a receiver.

170 pounds of cyclohexanone were charged, followed by heating to 100° C. under full vacuum. 70 pounds of cyclohexanone were then stripped off to remove water.

10 pounds of isophorone diisocyanate were then charged, followed by 24 pounds of dry cyclohexanone.

11.3 grams of a stannous octoate catalyst dissolved in 215.7 grams of cyclohexanone were then added.

The charge was adjusted to 50° C. and a purge was begun using nitrogen and air (5 standard cubic feet per hour of nitrogen and 3 cubic feet per hour of air). 15.7 pounds of TONE-M-100 were added, followed by 1 pound of stripped cyclohexanone.

The charge was held at 65° C. for 6 hours and was then cooled and allowed to stand for 16 hours. This was then sampled and tested for free diisocyanate. It was found that 10% of the original diisocyanate remained.

This intermediate was discharged into a storage drum, providing 104 pounds of product. The still was washed with a 50/50 acetone-toluene wash, which was discarded.

The still was then charged with 194 pounds of cyclohexanone, followed by 41 pounds of Phenoxy Resin B. The still was placed under a vacuum of 28 inches of mercury and was heated to 100° C. 75 pounds of cyclohexanone was then stripped off.

After a wait of about 2 hours, 65 pounds of the intermediate was charged to the still, added over 30 minutes. The nitrogen-air purge was then restored. 5 pounds of dry cyclohexanone were added as a chaser.

The reaction was allowed to proceed at 65° C. for 6 hours. The reaction mixture was then cooled to room temperature and was allowed to stand for about 12 hours. The reaction mixture was then reheated to 65° C., and 7 grams of stannous octoate catalyst were added, dissolved in 135 grams of cyclohexanone. This reaction mixture was held for about 6-½ hours at 65° C. and was then cooled, being allowed to stand overnight. Some of the resulting reaction product was then discharged into three 5-gallon pails. An analysis for NCO was performed, utilizing the standard dibutyl amine technique. The analysis indicated 0.074 milliequivalents NCO/gram.

To the product left in the reactor after the product discharge into the three 5-gallon pails, 134.3 grams of methanol were added with mixing for 15 minutes. The resulting product mixture was then likewise discharged into three additional 5-gallon pails, providing a total of 113 pounds of product.

A viscosity stability determination was then made, utilizing a sample placed in a Gardener tube which was placed in a bath maintained at 48° C. The sample in the tube was then taken out periodically, equilibrated to 25° C. and the viscosity determined. In 4 days, the product discharge from the still prior to the methanol treatment had gelled. The methanol-treated product, which had an original viscosity of 660 centistokes (CKS) at 25° C., had a viscosity after 30 days storage at 48° C. of 2450 CKS. The product was still fluid and was capable of being processed further.

The methanol-treated reaction product was then phosphorylated, and a magnetic recording medium was prepared. In a 2000 ml., round-bottomed flask equipped with a mechanical stirrer, thermometer and water-cooled condenser, under a dry air blanket, was placed 819.3 grams of a 23.9% (W/W) solution of the reaction product in cyclohexanone. The solution was heated to 60° C. with good agitation and 0.7 grams $P_2O_5$ (1.0 mole percent) were then added. After one hour at 60° C., all the $P_2O_5$ had dissolved and reacted. The clear amber solution which resulted had a viscosity of 1720 CKS at 25° C. and a solids content of 24.1%. A 1-2 mil drawdown on glass showed total resistance to cyclohexanone after exposure to an electron beam dose of 2 Mrads at 175 Kv.

A magnetic recording medium preparation was made using the general procedure previously described, employing 30 grams of the phosphorylated resin, 170 grams of the pigment and 330 grams of the cyclohexanone. After one hour of milling, the viscosity of the dispersion was 9400 cps. at 25° C. The Gloss measured was 71 and the Squareness Ratio was 0.84. A sample of a 1-2 mil. drawdown was cured using an electron beam. Total resistance to cyclohexanone was achieved at a dosage of 5 Mrads at 175 Kv.

Also, a sample of the phosphorylated resin was analyzed using phosphorus NMR. No detectable level of free phosphoric acid was noted.

EXAMPLE 66

This Example shows the preparation of a phosphorylated resin of the present invention similar to that obtained in Example 65, except that a higher level of phosphorylation was utilized.

819.3 grams of the reaction product of Phenoxy Resin A and TONE-M-100/IPDI adduct obtained in Example 65 were reacted with 1.05 grams of $P_2O_5$ (1.5 mole percent). The reaction mixture was heated for 30 minutes at 63° C. and was then allowed to stand at room temperature overnight. The resulting product was a clear, amber yellow having a viscosity of 890 CKS at 25° C. and a solids contents of 24.2%.

A pigment grind was prepared using the procedure described herein. After one hour of milling, the dispersion had a viscosity of 7000 CKS. The Gloss was measured as 78 and the Squareness Ratio at 0.82. The performance after curing using electron beam radiation was similar to that obtained in Example 65.

EXAMPLE 67

This Example illustrates the preparation of a phosphorylated resin prepared to similar to the procedure used in Example 65, except that more rapid stirring was used together with lower temperatures.

The phosphorylation was performed in a quart Waring Blender. 301 grams of the reaction product described in Example 65 and 0.265 grams $P_2O_5$ were charged. The mixture was stirred for 15 minutes at the highest speed. The temperature of the charge rose from an initial temperature of 25° C. to 75° C. All of the $P_2O_5$ dissolved, and a clear amber solution resulted. This solution had a viscosity of 900 CKS at 25° C. and a solids content of 24.15%.

A pigment grind was made; and, after one hour of milling, the blend had a viscosity of 7700 cps. The Gloss was measured as 73 and the Squareness Ratio as 0.84. A drawdown performed, in electron beam curing, similar to that achieved in Example 65.

EXAMPLE 68

This Example shows the preparation of a phosphorylated resin of this invention similar to that obtained in Example 65, except that the phosphorylation was carried out on a larger scale.

Using 11,150 grams of the reaction product obtained in Example 65, $P_2O_5$ was charged in two shots, spaced ten minutes apart, the quantities being 5.5 grams and 4.02 grams. The reaction mixture was heated for a total of 90 minutes, at which time some $P_2O_5$ had not yet dissolved. The reaction mixture was then allowed to stand overnight at room temperature. Some undissolved $P_2O_5$ still remained.

The resin was filtered throught Bolting Cloth to give a clear solution, which solution had a viscosity of 830 CKS at 25° C. and a solids content of 24.2%.

A pigment grind was prepared using the procedure of Example 65. After one hour of milling, the blend had a viscosity of 9800 cps. The Gloss was measured at 62 and the Squareness Ratio at 0.85.

EXAMPLE 69

This Example illustrates that the Gloss of the recording medium prepared in Example 68 can be increased by increasing the level of phosphorylation.

Using the remaining phosphorylated resin from Example 68 that was not used in forming the magnetic recording media, a solution of 10,195 grams of the phosphorylated resin and 1.0 grams $P_2O_5$ was heated to 62° C. After five minutes, an additional charge of 3.40 grams of $P_2O_5$ was added, providing a total level of phosphorylating agent, including the original reaction, of 1.5 mole percent. This reaction mixture was heated for a total of 2-174 hours at 60° C.

The resulting solution was then filtered. The viscosity and solids were unchanged. A magnetic recording medium was prepared using the procedure described herein. After one hour of milling, the blend had a viscosity of 8300 cps. The Gloss was 78 and the Squareness Ratio was 0.86.

EXAMPLE 70

This Example shows the preparation of phosphorylated resins similar to that prepared in Example 65 on a pilot plant scale.

190 pounds of cyclohexanone were added, after which 70 pounds were stripped. Then, 13.5 pounds of isophorone diisocyanate and 21.2 pounds of TONE-M-100 were charged to the still described in Example 65.

Thereafter, 15.3 grams of stannous octoate dissolved in 218 grams of cyclohexanone were added, followed by a 1-pound cyclohexanone chaser. The reaction was allowed to proceed for 6 hours, and the reaction mixture was thereafter cooled to ambient conditions. After analyzing for residual isocyanate, it was found that a 72% conversion had been obtained. The mixture was thereafter heated again for 3 hours and resampled. The conversion at this point was 79%. After an additional 1-½ hours, 7.7 grams of stannous octoate catalyst dissolved in 218 grams of cyclohexanone were then added; and the reaction was allowed to proceed for 4 hours at a temperature of about 66° C. The product was then discharged into a drum, and analysis indicated that a 94% conversion had been obtained. About 130.5 pounds of this adduct was obtained.

About 62 pounds of the adduct were then added to 41 pounds of Phenoxy Resin B dissolved in 194 pounds of cyclohexanone. After a reaction time of 7-½ hours, the mixture was cooled and then allowed to stand overnight. After analysis indicated that the free NCO content was 0.081 milliequivalents/gram, the temperature was elevated to 65° C., and 7.7 grams of stannous octoate in 200 grams of cyclohexanone were added. The reaction proceeded for 4-½ hours. Analysis indicated that the free NCO content was 0.076 milliequivalents/gram. 243 grams of methanol were then added, with stirring for one hour at 65° C., and this intermediate was then discharged. A total product of about 232 pounds was obtained, having a viscosity of 370 CKS at 25° C.

After storage for 30 days at 48° C., the viscosity of the product was 460 CKS at 25° C.

222.8 pounds of the intermediate were added to the still with 129 grams of $P_2O_5$. The phosphorylation level was 1.5 mole percent. This reaction mixture was heated to 65° C. for 2 hours and was then cooled and left in the still overnight. The product was then filtered into 5-gallon pails. About 203.7 pounds of product were obtained, the product having excellent viscosity stability. The viscosity was 420 CKS at 25° C. and had a solids content of 24.3%.

A magnetic recording medium was made using the procedure described herein. After one hour of milling, the medium had a viscosity of 7200 cps. at 25° C. The Gloss was measured at 68 and the Squareness Ratio at 0.84.

EXAMPLE 71

This Example illustrates the preparation of a resin similar to that prepared in Example 65, except that tetrahydrofuran (THF) was used as the solvent.

Using the still described in Example 65, 10 pounds of isophorone diisocyanate were added together with an amount of TONE-M-100 in the same ratio as is described in Example 65 (viz.—about 15.7 pounds). An amount of THF was added to provide the same solids level content as used in Example 65. 23.11 grams of a 50/50 weight mixture of stannous octoate and a commercially available triethylene diamine catalyst were then added, dissolved in 109 grams THF, which had been dried using molecular sieves. A nitrogen/air purge was likewise used.

The reaction mixture was heated to 58°-59° C. for 7 hours. After analysis indicating that 4.23% of isophorone diisocyanate remained, 5.8 grams of stannous octoate catalyst dissolved in 119.2 grams of THF were added. A purge (with the air reduced by 20% from that described in Example 65) was initiated; and the mixture was heated for 3-¼ additional hours. Thereafter, the reaction mixture was cooled. Analysis indicated that the isophorone diisocyanate content was then about 1.6%. Continued heating for 1 hour and 50 minutes was then carried out. The adduct was then discharged, providing about 99.7 pounds.

40 pounds of Phenoxy Resin B (dried in a vacuum oven) were added to the still, dissolved in 118 pounds of THF that had been dried using molecular sieves. Thereafter, 64 pounds of the adduct were added over 15 minutes. This reaction mixture was heated to a temperature of 58°-60° C. using a purge (5 standard cubic feet per hour of nitrogen and 2 standard cubic feet of air per hour). The reaction was allowed to proceed for 3 hours. Analysis indicated that the NCO content was 0.106 milliequivalents/gram.

5.8 grams of stannous octoate catalyst were then added dissolved in 119.2 grams of THF. The reaction mixture was heated to 60°-62° C. for an additional 6-¼ hours. This reaction mixture was then cooled and allowed to stand overnight. Analysis indicated that the free NCO content was 0.059 milliequivalents/gram.

Additional heating was then carried out for about 4 hours at a temperature of 59°-60° C. Analysis indicated that the free NCO content was 0.045 milliequivalents/gram, and the viscosity of the product was 110 CKS at 25° C.

Methanol in an amount of 183 grams was then mixed into the product over 15 minutes and then discharged. The total yield was about 172.9 pounds.

Into a 2-liter flask, there was charged 1240 grams of the methanol-capped product. After heating to 55° C., 2.09 grams of $H_4P_2O_7$ (polyphosphoric acid) were added (providing about 1.5 mole percent phosphorylating agent). The solution was then heated at 55° C. for a total of 1 hour and 40 minutes. The solution which resulted was clear and was a very light yellow, having a viscosity of 100 CKS at 25° C. and a solids content of 25.1%.

A magnetic recording medium was prepared using the procedure described herein. After one hour of milling, the viscosity was 6500 cps., the Gloss was measured as 92 and the Squareness Ratio at 0.83.

EXAMPLE 72

This Example shows the preparation and use of the phosphorylated resins of the present invention in which the adduct employed uses hydroxyethyl acrylate.

Into a flame-dried 500 ml. reaction flask, equipped with a mechanical stirrer, a water-cooled condenser, a drop funnel, and thermometer, were placed 229 ml. (203 grams) of a molecular sieve-dried THF. Light nitrogen sparging and stirring were started. In this order, were added 0.07 grams of stannous octoate catalyst, 0.07 grams of triethylene diamine, and then 44.4 grams of isophorone diisocyanate. After five minutes of mixing, 23.2 grams of hydroxyethyl acrylate were added over three minutes. The heat was turned on; and, after 15 minutes, the temperature had reached 55° C. The nitrogen sparge was switched to a nitrogen blanket over the solution. After 4 hours, a sample was removed and was analyzed to contain 4.06% isophorone diisocyanate by liquid chromatography analysis. After 50 more minutes, 0.036 grams of additional stannous octoate catalyst were added, and heating was continued for one more hour at 55° C. Removal and analysis of another sample indicated that the mixture contained 2.23% isophorone diisocyanate.

The adduct was then reacted with Phenoxy Resin B as hereinafter set forth. A solution of 284 grams of Phenoxy Resin B in 951 ml. of THF was made in a 2-liter, reaction flask, equipped with the components described in preparing the adduct, except that the drop funnel was eliminated. The resulting solution was then lightly sparged with nitrogen for 4 hours and 15 minutes at 55° C. At this point, the adduct solution was poured in; and the nitrogen sparge was switched to a blanket. The resulting solution was heated at 55° C. for 30 minutes and then cooled and held at 25° C. for 72 hours under a nitrogen blanket.

The temperature was then restored to 55° C. and held for 5-½ hours, at which time 0.036 grams of additional stannous octoate catalyst were added. Heating was thereafter continued for 2-½ hours at 55° C. The solution was then cooled and held at 25° C. for 16 hours. Heating was again begun with the temperature raised to 55° C. for 2-¼ hours. An additional 0.036 grams of stannous octoate catalyst were then added, and heating was continued for an additional 4 hours at 55° C. Analysis of the reaction product indicated the free isocyanate level to be 0.051 milliequivalents/gram, utilizing the known dibutyl amine titration method. Then, while the reaction product was kept at 55° C., 3.35 ml. (2.68 grams) of methanol were added. After stirring for an additional 15 minutes, the resulting solution was cooled to 25° C. and stored under nitrogen. The total product yield was about 1122 grams.

The grafted reaction product remaining in the reactor was then heated to 55° C., again under a nitrogen blanket. 2.08 grams of $H_4P_2O_7$ (polyphosphoric acid) were added as fast it could be poured with good agitation. The resulting solution was then heated to 55° C. for 2 hours, was then cooled, and the product was then discharged. The product had a viscosity of 180 CKS at 25° C. and had a solids content of 25.3%.

Using the procedure described herein, a magnetic recording medium was made using 118.6 grams of the resin, 170 grams of the pigment and 241.4 grams of cyclohexanone. After one hour of milling, the viscosity of the final mix was 5600 cps. at 25° C. The 60° Gloss, as measured on an air-dried drawdown on glass, was 91. The Squareness Ratio was calculated to be almost 0.86 from magnetic measurements.

We claim:

1. A phosphorylated composition for enhancing the dispersibility of particles in a medium of a member selected from the group consisting of:
   (a) a vinyl chloride copolymer or terpolymer having a number average molecular weight of at least about 1000 and at least about 0.1 percent by weight hydroxyl group present in said vinyl chloride copolymer or terpolymer or present in the monomers from which the vinyl chloride copolymer or terpolymer is prepared prior the phosphorylation, selected from the group consisting of:
      (i) vinyl chloride-vinyl ester copolymers and terpolymers wherein at least some of said vinyl ester groups are hydrolyzed, said vinyl ester being an ester of a saturated carboxylic acid having from 1 to 6 carbon atoms, and said vinyl chloride-vinyl ester copolymers and terpolymers having a molar ration of from about 28 to about 32 vinyl chloride to about 0.5 to about 8 vinyl alcohol and to 0 to about 4 vinyl ester; and
      (ii) a hydroxyl-functional copolymer or terpolymer of vinyl chloride, a hydroxyalkyl acrylate or methacrylate having from 2 to 5 carbon atoms in the alkyl segment, and a vinyl ester of a saturated carboxylic acid having from 1 to 6 carbon atoms, said hydroxyl-functional copolymer or terpolymer having a molar ratio of from about 12 to about 20 vinyl chloride to about 1 to about 3 hydroxyalkyl acrylate or methacrylate and to 0 to about 3 vinyl ester;
   (b) a hydroxyalkyl acrylate or methacrylate-lactone adduct having the following formula:

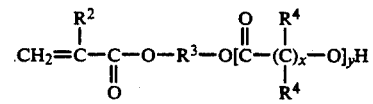

wherein $R^2$ is hydrogen or methyl, $R^3$ is an alkyl group of 2 to about 10 carbon atoms, $R^4$ is hydrogen or an alkyl group of from 1 to about 12 carbon atoms, x is from about 4 to about 7, and y is from 1 to about 10; and
   (c) the reaction product of a normally solid pendant-hydroxyl-containing thermoplastic polymer having at least 8 hydroxyl groups per molecule chain and an adduct which is the product of an organic diisocyanate and a member selected from the group consisting of:
      (i) a hydroxylalkyl acrylate or methacrylate; and (ii) a hydroxyalkyl acrylate or methacrylate-lactone adduct having the following formula:

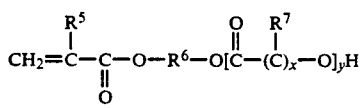

wherein $R^5$ is hydrogen or methyl, $R^6$ is an alkyl group of 2 to about 10 carbon atoms, $R^7$ is hydrogen or an alkyl group of from 1 to about 12 carbon atoms, x is from about 4 to about 7, and y is from 1 to about 10;

a sufficient number of the hydroxyl group present in said members (a) through (c) having been phosphorylated to enhance the dispersibility of said particles in said medium.

2. The composition of claim 1 wherein the number average molecular weight of said vinyl chloride copolymer or terpolymer is at least about 2000.

3. The composition of claim 1 wherein the number average molecular weight of said vinyl chloride copolymer or terpolymer is at least about 4000.

4. The composition of claim 1 wherein the number average molecular weight of said vinyl chloride copolymer or terpolymer is at least about 8000.

5. The composition of claim 1 wherein the number average molecular weight of said vinyl chloride copolymer or terpolymer is at least about 23000.

6. The composition of claim 1 wherein said vinyl chloride copolymer or terpolymer has a molar ratio of from about 28 to about 32 vinyl chloride to about 0.5 to about 8 vinyl alcohol and to 0 to about 4 vinyl ester.

7. The composition of claim 6 wherein said vinyl ester is vinyl acetate.

8. The composition of claim 1 wherein said vinyl chloride copolymer or terpolymer is a hydroxyl-functional copolymer or terpolymer with a molar ratio of from about 12 to about 20 vinyl chloride to about 1 to about 3 hydroxyalkyl acrylate or methacrylate and to 0 to about 3 vinyl ester.

9. The composition of claim 8 wherein said vinyl ester is vinyl acetate.

10. The composition of claim 8 wherein said vinyl chloride copolymer or terpolymer is a vinyl chloride-hydroxyethyl acrylate copolymer.

11. The composition of claim 8 wherein said vinyl chloride copolymer or terpolymer is a vinyl chloride-hydroxypropyl acrylate copolymer.

12. The composition of claim 8 wherein said vinyl chloride copolymer or terpolymer is a vinyl chloride-hydroxyethyl acrylate-vinyl acetate copolymer.

13. The composition of claim 8 wherein said vinyl chloride copolymer or terpolymer is a vinyl chloride-hydroxypropyl acrylate-vinyl acetate terpolymer.

14. The composition of claim 1 wherein the hydroxyalkyl acrylate or methacrylate-lactone adduct is a hydroxyethyl acrylate adduct.

15. The composition of claim 1 wherein the hydroxyalkyl acrylate or methacrylate-lactone adduct is a hydroxyethylmethacrylate adduct.

16. The composition of claim 1 wherein the hydroxyalkyl acrylate or methacrylate-lactone adduct is a hydroxypropyl acrylate adduct.

17. The composition of claim 1 wherein the hydroxyalkyl acrylate or methacrylate-lactone adduct is a hydroxypropyl methacrylate adduct.

18. The composition of claim 1 wherein the hydroxyalkyl acrylate or methacrylate-lactone adduct is an adduct of a hydroxyalkyl acrylate or methacrylate and epsilon-caprolactone and wherein y in the formula of claim 1 has an average value of from about 1 to about 4.

19. The composition of claim 18 wherein y has an average value of about 2.

20. The composition of claim 18 wherein said hydroxyalkyl acrylate or methacrylate is hydroxyethyl acrylate.

21. The composition of claim 1 wherein said reactant is a phenoxy resin.

22. The composition of claim 21 wherein about 1 to about 5 percent of the hydroxyl groups present are phosphorylated.

23. The composition of claim 1 wherein said composition is a phosphorylated vinyl chloride copolymer or terpolymer.

24. The composition of claim 13 wherein a sufficient percentage of the hydroxyl groups present is phosphorylated to provide at least about 0.1 percent phosphorus.

25. The composition of claim 13 wherein a sufficient percentage of the hydroxyl groups present is phosphorylated to provide at least about 0.3% phosphorus by weight.

26. A composition according to claim 1 wherein the phosphorus moiety of the phosphorylated hydroxyl group is characterized by the formula:

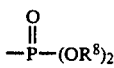

wherein $R^8$ comprises hydrogen, an alkyl or alkenyl having from 1 to about 20 carbon atoms, an alkyl acrylate or methacrylate residue having from 2 to about 10 carbon atoms in the alkyl segment, substituted and unsubstituted phenyl, said lactone-adduct, or mixtures thereof.

27. The composition of claim 26 wherein $R^8$ comprises hydrogen.

28. The composition of claim 26 wherein $R^8$ comprises a residue of said hydroxyalkyl acrylate or methacrylate-lactone adduct.

29. The composition of claim 28 wherein said hydroxyalkyl acrylate or methacrylate is hydroxyethyl acrylate and said lactone is epsiloncaprolactone and wherein y in the formula of claim 26 has an average value of from about 1 to about 4.

30. The composition of claim 26 wherein $R^8$ comprises phenyl.

31. The composition of claim 26 wherein $R^8$ comprises an alkyl of 1 to about 20 carbon atoms.

32. The composition of claim 31 wherein said alkyl is ethyl.

33. The composition of claim 31 wherein said alkyl is n-butyl.

34. The composition of claim 26 wherein said composition is a phenoxy resin wherein X is a residue of bisphenol-A, R is hydrogen, n is at least about 80 and $R^8$ comprises hydrogen.

35. The composition of claim 26 wherein said composition is a phenoxy resin wherein X is a residue of bisphenol-A, R is hydrogen, n is at least about 80 and $R^8$ comprises n-butyl.

36. The composition of claim 26 wherein said composition is a phenoxy resin wherein X is a residue of bisphenol-A, R is hydrogen, n is at least about 80 and R⁸ comprises a residue of said lactone-adduct.

37. The composition of claim 26 wherein said member is reaction production (d) and said thermoplastic polymer is a phenoxy resin having the following formula:

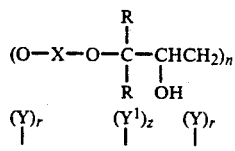

wherein X is Ar—R¹—Ar, Ar or mixtures thereof; Ar is an aromatic divalent hydrocarbon; Y and Y¹ are alkyl radicals, halogen atoms or alkoxy radicals; r and z are integers having a value from 0 to a maximum value corresponding to the number of hydrogen atoms on Ar capable of being replaced by substituents; R¹ is a bond between adjacent carbon atoms, a divalent radical, a divalent hydrocarbon radical, a polyalkoxy radical, a polysiloxy radical, two or more alkylidene radicals separated by an aromatic ring, a tertiary amino group, an ether linkage, a carboxyl group or a sulfur-containing group; R is hydrogen or an alkyl of from 1 to about 20 carbon atoms, and n is at least about 50.

38. The composition of claim 32 wherein said adduct is a product of an organic diisocyanate and a hydroxyalkyl acrylate or methacrylate.

39. The composition of claim 38 wherein said hydroxyalkyl acrylate is hydroxyethyl acrylate.

40. The composition of claim 37 wherein said adduct is a product of an organic diisocyanate and a hydroxyalkyl acrylate or methacrylate-lactone adduct.

41. The composition of claim 40 wherein the lactone is epsilon-caprolactone and the hydroxyalkyl acrylate is 2-hydroxyethyl acrylate.

42. The composition of claim 40 wherein said organic diisocyanate is isophorone diisocyanate.

43. The composition of claim 37 wherein said composition includes methanol in an amount sufficient to stabilize the viscosity of said composition.

* * * * *